(12) United States Patent
Menas et al.

(10) Patent No.: US 7,816,807 B2
(45) Date of Patent: Oct. 19, 2010

(54) AUTOMATIC SENSING POWER SYSTEMS AND METHODS

(76) Inventors: Gregory W. Menas, 317 Whitfield, Wichita, KS (US) 67206; Brent A. Miller, 1226 N. Carlos, Wichita, KS (US) 67203; Steve Spano, 12 Lake Rd., Dryden, NY (US) 13053-9723

( * ) Notice: Subject to any disclaimer, the term of this patent is extended or adjusted under 35 U.S.C. 154(b) by 617 days.

(21) Appl. No.: 11/334,082

(22) Filed: Jan. 18, 2006

(65) Prior Publication Data

US 2006/0119182 A1 Jun. 8, 2006

Related U.S. Application Data

(63) Continuation of application No. 10/983,507, filed on Nov. 5, 2004.

(60) Provisional application No. 60/518,374, filed on Nov. 7, 2003.

(51) Int. Cl.
*H02J 1/00* (2006.01)
*H02J 3/00* (2006.01)

(52) U.S. Cl. ............................................. 307/11
(58) Field of Classification Search ............. 307/11
See application file for complete search history.

(56) References Cited

U.S. PATENT DOCUMENTS

| | | |
|---|---|---|
| 4,335,445 A | 6/1982 | Nercessian |
| 4,659,941 A | 4/1987 | Quiros et al. |
| 4,761,725 A | 8/1988 | Henze |
| 4,915,639 A | 4/1990 | Cohn et al. |
| 5,051,720 A | 9/1991 | Kittirutsunetorn |
| 5,079,410 A | 1/1992 | Payne et al. |
| 5,103,110 A | 4/1992 | Housworth et al. |
| 5,300,864 A | 4/1994 | Allen, Jr. |
| 5,329,491 A | 7/1994 | Brown et al. |
| 5,347,211 A | 9/1994 | Jakubowski |
| 5,406,091 A | 4/1995 | Burba et al. |
| 5,481,730 A | 1/1996 | Brown et al. |
| 5,532,914 A | 7/1996 | Kageyama et al. |
| 5,550,729 A | 8/1996 | Wissell |
| 5,570,002 A | 10/1996 | Castleman |
| 5,652,893 A | 7/1997 | Ben-Meir et al. |
| 5,847,950 A | 12/1998 | Bhagwat |
| 5,886,422 A | 3/1999 | Mills |

(Continued)

FOREIGN PATENT DOCUMENTS

JP     08-182191     12/1996

(Continued)

OTHER PUBLICATIONS

U.S. Appl. No. 11/777,207, filed Jul. 12, 2007, entitled Automatic Sensing Power Systems and Methods, 76 pages.

(Continued)

*Primary Examiner*—Jared J Fureman
*Assistant Examiner*—Dru M Parries
(74) *Attorney, Agent, or Firm*—Polsinelli Shughart PC

(57) ABSTRACT

An automatic sensing power system automatically determines a power requirement for an electrical device, converts power to the required level, and outputs the power to the electrical device when the electrical device is connected to the automatic sensing power system.

40 Claims, 27 Drawing Sheets

U.S. PATENT DOCUMENTS

| | | | |
|---|---|---|---|
| 5,900,684 | A | 5/1999 | Lam |
| 5,905,370 | A | 5/1999 | Bryson |
| 5,928,365 | A | 7/1999 | Yoshida |
| 5,939,868 | A | 8/1999 | Hall et al. |
| 5,958,056 | A | 9/1999 | Lehmann |
| 5,973,948 | A | 10/1999 | Hahn et al. |
| 6,058,030 | A | 5/2000 | Hawkes et al. |
| 6,137,188 | A | 10/2000 | Mitchell et al. |
| 6,149,319 | A | 11/2000 | Richter et al. |
| 6,172,891 | B1 | 1/2001 | O'Neal et al. |
| 6,232,675 | B1 | 5/2001 | Small |
| 6,262,567 | B1 | 7/2001 | Bartlett |
| 6,327,663 | B2 | 12/2001 | Isaac et al. |
| 6,396,169 | B1 | 5/2002 | Voegeli et al. |
| 6,445,087 | B1 | 9/2002 | Wang et al. |
| 6,448,672 | B1 | 9/2002 | Voegeli et al. |
| 6,459,175 | B1 | 10/2002 | Potega |
| D465,200 | S | 11/2002 | Duryea |
| 6,512,682 | B2 * | 1/2003 | Cohen et al. ............... 363/146 |
| 6,538,341 | B1 | 3/2003 | Lang |
| 6,634,896 | B1 | 10/2003 | Potega |
| 6,643,158 | B2 | 11/2003 | MacDonald et al. |
| 6,650,560 | B2 | 11/2003 | MacDonald et al. |
| 6,651,178 | B1 | 11/2003 | Voegeli et al. |
| 6,653,814 | B1 | 11/2003 | Patino |
| 6,697,897 | B1 | 2/2004 | Friel et al. |
| 6,700,808 | B2 | 3/2004 | MacDonald et al. |
| 6,715,022 | B1 | 3/2004 | Ahern |
| 6,744,150 | B2 | 6/2004 | Rendic |
| 6,751,109 | B2 | 6/2004 | Doss et al. |
| 6,765,365 | B2 | 7/2004 | Kim et al. |
| 6,775,163 | B2 | 8/2004 | McDonald et al. |
| 6,791,853 | B2 | 9/2004 | Afzal et al. |
| 6,811,444 | B2 | 11/2004 | Geyer |
| 6,829,547 | B2 | 12/2004 | Law et al. |
| 7,242,111 | B2 | 7/2007 | Menas et al. |
| 7,285,874 | B2 | 10/2007 | Menas et al. |
| 7,485,986 | B2 | 2/2009 | Menas et al. |
| 7,508,092 | B2 | 3/2009 | Menas et al. |
| 7,514,814 | B2 | 4/2009 | Menas et al. |
| 7,579,711 | B2 | 8/2009 | Menas et al. |
| 7,602,079 | B2 | 10/2009 | Menas et al. |
| 7,646,111 | B2 | 1/2010 | Menas et al. |
| 2002/0071290 | A1 | 6/2002 | Youn et al. |
| 2002/0187682 | A1 | 12/2002 | Lincoln, III et al. |
| 2003/0060243 | A1 | 3/2003 | Burrus, IV |
| 2003/0073342 | A1 | 4/2003 | Geyer |
| 2003/0086279 | A1 | 5/2003 | Bourdillon |
| 2003/0129869 | A1 | 7/2003 | Milan |
| 2003/0230934 | A1 | 12/2003 | Cordelli et al. |
| 2004/0130213 | A1 | 7/2004 | Goldsholl |
| 2004/0218411 | A1 | 11/2004 | Luu et al. |
| 2005/0102043 | A1 | 5/2005 | Menas et al. |
| 2006/0119182 | A1 | 6/2006 | Menas et al. |
| 2006/0119993 | A1 | 6/2006 | Menas et al. |
| 2006/0119994 | A1 | 6/2006 | Menas et al. |
| 2006/0129252 | A1 | 6/2006 | Menas et al. |
| 2006/0129253 | A1 | 6/2006 | Menas et al. |
| 2006/0183510 | A1 | 8/2006 | Menas et al. |
| 2006/0202557 | A1 | 9/2006 | Menas et al. |
| 2007/0205666 | A1 | 9/2007 | Menas et al. |
| 2007/0225833 | A1 | 9/2007 | Menas et al. |
| 2007/0252436 | A1 | 11/2007 | Menas et al. |
| 2007/0252437 | A1 | 11/2007 | Menas et al. |
| 2007/0252438 | A1 | 11/2007 | Menas et al. |
| 2007/0252439 | A1 | 11/2007 | Menas et al. |
| 2007/0257559 | A1 | 11/2007 | Menas et al. |
| 2007/0257560 | A1 | 11/2007 | Menas et al. |
| 2007/0273208 | A1 | 11/2007 | Menas et al. |
| 2007/0273215 | A1 | 11/2007 | Menas et al. |

FOREIGN PATENT DOCUMENTS

| | | |
|---|---|---|
| JP | 2003-216284 | 7/2003 |
| JP | 3-8888 | 1/2008 |
| RU | 2231902 | 6/2004 |
| WO | WO 01/43266 | 6/2001 |
| WO | WO 2005/013456 | 2/2005 |

OTHER PUBLICATIONS

Notice of Allowance and Fee(s) Due and Notice of Allowability, dated Aug. 31, 2007, U.S. Appl. No. 11/334,084, Automatic Sensing Power systems and Methods, 5 pages.

Office Action for U.S. Appl. No. 11/777,214, Automatic Sensing Power Systems and Methods, dated Nov. 29, 2007, 5 pages.

Office Action for U.S. Appl. No. 11/746,391, Automatic Sensing Power Systems and Methods, dated Sep. 24, 2007, 5 pages.

Office Action for U.S. Appl. No. 11/334,078, Automatic Sensing Power Systems and Methods, dated Dec. 28, 2007, 7 pages.

Office Action for U.S. Appl. No. 11/334,143, Automatic Sensing Power Systems and Methods, dated Nov. 2, 2007, 9 pages.

Office Action for U.S. Appl. No. 10/983,507, Automatic Sensing Power Systems and Methods, dated Jul. 2, 2007, 8 pages.

English translation of Notice of Reasons for Rejection for Japanese Patent Application No. 2006-539737, Automatic Sensing Power Systems and Methods, dated Sep. 26, 2007, 3 pages.

Notice of Allowance and Fee(s) Due and Notice of Allowability, dated Mar. 9, 2007, U.S. Appl. No. 11/334,084, Automtic Sensing Power Systems and Methods, 5 pages.

Office Action, dated Jul. 25, 2006, U.S. Appl. No. 11/334,084, Automatic Sensing Power Systems and Methods, 10 pages.

Notice of Allowance and Fee(s) Due and Notice of Allowability, dated Feb. 7, 2007, U.S. Appl. No. 11/334,094, Automatic Sensing Power Systems and Methods, 4 pages.

Office Action, dated Jul. 25, 2006, U.S. Appl. No. 11/334,094, Automatic Sensing Power Systems and Methods, 11 pages.

International Search Report and Written Opinion, dated Mar. 22, 2005, PCT/US2004/037326, Automatic Sensing Power Systems and Methods, 12 pages.

Written Opinion, dated Aug. 26, 2005, PCT/US2004/037326, Automatic Sensing Power Systems and Methods, 5 pages.

International Preliminary Examination Report, dated Feb. 1, 2006, PCT/US2004/037326, Automatic Sensing Power Systems and Methods, 61 pages.

U.S. Appl. No. 11/746,391, filed May 9, 2007, entitled Automatic Sensing Power Systems and Methods, 78 pages.

U.S. Appl. No. 11/752,846, filed May 23, 2007, entitled Automatic Sensing Power Systems and Methods, 80 pages.

Cherry Semiconductor, "*5 Bit Synchronous CPU Controller With Power-Good and Current Limit*", CS-5166, Jul. 30, 1998, pp. 1-23.

Embedded Pentium® Processor Family Developer's Manual, Chapter 18.0 Hardware Interface, Intel®, 1997, pp. 1-65.

Linear Technology, "*5-Bit Programmable Synchronous Switching Regulator Controller for Pentium® II Processor*", LTC 1753, Sep. 1998, pp. 1-24.

Linear Technology, "*5-Bit Programmable Synchronous Switching Regulator Controller for Pentium® II Processor*", LTC 1553, 1994, pp. 1-24.

Pentium Processor® with MMX™ Technology, Chapter 9.0 Electrical Specifications. Intel®, 1997, pp. 21-36.

Unitrode, "Average Current Mode Synchronous Controller With 5-Bit DAC", UCC2882/-1, Nov. 1998. pp. 1-13.

VRM 8.3 DC-DC Converter Design Guidelines, Intel®, Mar. 1999. Order No. 243870-002, pp. 1-14.

Office Action for U.S. Appl. No. 11/777,224, Automatic Sensing Power Systems and Methods, dated Jan. 7, 2008, 4 pages.

Office Action for U.S. Appl. No. 11/334,098, Automatic Sensing Power Systems and Methods, dated Feb. 12, 2008, 6 pages.

Office Action for U.S. Appl. No. 11/746,391, Automatic Sensing Power Systems and Methods, dated Feb. 22, 2008, 6 pages.

Office Action for U.S. Appl. No. 11/777,229, Automatic Sensing Power Systems and Methods, dated Apr. 2, 2008, 5 pages.

Office Action for U.S. Appl. No. 11/334,132, Automatic Sensing Power Systems and Methods, dated Apr. 7, 2008, 6 pages.
Office Action for U.S. Appl. No. 10/983,507, Automatic Sensing Power Systems and Methods, dated Apr. 11, 2008, 6 pages.
Office Action for U.S. Appl. No. 11/334,078, Automatic Sensing Power Systems and Methods, dated May 28, 2008, 6 pages.
Office Action for U.S. Appl. No. 11/334,143, Automatic Sensing Power Systems and Methods, dated May 29, 2008, 7 pages.
Office Action for U.S. Appl. No. 11/777,209, Automatic Sensing Power Systems and Methods, dated Aug. 7, 2008, 4 pages.
Office Action for U.S. Appl. No. 11/777,207, Automatic Sensing Power Systems and Methods, dated Aug. 7, 2008, 6 pages.
Office Action for U.S. Appl. No. 11/777,227, Automatic Sensing Power Systems and Methods, dated Sep. 29, 2008, 5 pages.
Office Action for U.S. Appl. No. 11/777,212, Automatic Sensing Power Systems and Methods, dated Oct. 2, 2008, 5 pages.
Office Action for U.S. Appl. No. 10/983,507, Automatic Sensing Power Systems and Methods, dated Nov. 6, 2008, 10 pages.
Office Action for U.S. Appl. No. 11/334,132, Automatic Sensing Power Systems and Methods, dated Nov. 7, 2008, 12 pages.
Office Action for U.S. Appl. No. 11/334,098, Automatic Sensing Power Systems and Methods, dated Nov. 26, 2008, 10 pages.
Office Action for U.S. Appl. No. 11/334,143, Automatic Sensing Power Systems and Methods, dated Dec. 2, 2008, 11 pages.
Office Action for U.S. Appl. No. 11/334,078, Automatic Sensing Power Systems and Methods, dated Dec. 5, 2008, 11 pages.
Office Action for U.S. Appl. No. 10/983,507, Automatic Sensing Power Systems and Methods, dated Feb. 11, 2009, 9 pages.
Office Action for U.S. Appl. No. 11/334,143, Automatic Sensing Power Systems and Methods, dated Feb. 19, 2009, 11 pages.
Office Action for U.S. Appl. No. 11/334,078, Automatic Sensing Power Systems and Methods, dated Feb. 19, 2009, 8 pages.
Notice of Allowance for U.S. Appl. No. 11/777,214, Automatic Sensing Power Systems and Methods, dated Dec. 3, 2008, 6 pages.
Notice of Allowance for U.S. Appl. No. 11/746,391, Automatic Sensing Power Systems and Methods, dated Oct. 22, 2008, 5 pages.
Notice of Allowance for U.S. Appl. No. 11/777,224, Automatic Sensing Power Systems and Methods, dated Dec. 3, 2008, 6 pages.
Notice of Allowance for U.S. Appl. No. 11/777,214, Automatic Sensing Power Systems and Methods, dated Jan. 9, 2009, 6 pages.
Notice of Allowance for U.S. Appl. No. 11/777,229, Automatic Sensing Power Systems and Methods, dated Jan. 12, 2009, 5 pages.
Notice of Allowance for U.S. Appl. No. 11/334,098, Automatic Sensing Power Systems and Methods, dated Feb. 23, 2009, 6 pages.
Notice of Allowance for U.S. Appl. No. 11/334,132, Automatic Sensing Power Systems and Methods, dated Feb. 26, 2009, 6 pages.
Supplemental Notice of Allowability for U.S. Appl. No. 11/777,229, Automatic Sensing Power Systems and Methods, dated Feb. 19, 2009, 2 pages.
Supplemental Notice of Allowability for U.S. Appl. No. 11/777,214, Automatic Sensing Power Systems and Methods, dated Mar. 3, 2009, 2 pages.
Translation of the Extract of Cited Reference 2 (JPA (Laid-Open) No. 2003-216284) and Figures 1 and 2, cited in Notice of Reasons for Rejection, mailed Oct. 2, 2007, 3 pages.

Translation of Decision of Refusal for Japanese Patent Application No. 2006-539737, entitled Automatic Sensing Power Systems and Methods, 2 pages.
Translation of Japanese Patent Publication No. H08182191, entitled Power Source Adaptor, 13 pages.
Translation of Japanese Patent Publication No. 2003216284, entitled Power Unit and Electronic equipment, 34 pages.
Office Action for U.S. Appl. No. 11/777,207, Automatic Sensing Power Systems and Methods, dated May 7, 2009, 5 pages.
Office Action for U.S. Appl. No. 11/777,209, Automatic Sensing Power Systems and Methods, dated May 14, 2009, 10 pages.
Office Action for U.S. Appl. No. 11/777,227, Automatic Sensing Power Systems and Methods, dated Jun. 5, 2009, 5 pages.
Office Action for U.S. Appl. No. 11/777,212, Automatic Sensing Power Systems and Methods, dated Aug. 5, 2009, 9 pages.
Office Action for U.S. Appl. No. 11/777,217, Automatic Sensing Power Systems and Methods, dated Sep. 2, 2009, 10 pages.
Office Action for U.S. Appl. No. 11/777,216, Automatic Sensing Power Systems and Methods, dated Sep. 14, 2009, 5 pages.
Office Action for U.S. Appl. No. 10/983,507, Automatic Sensing Power Systems and Methods, dated Oct. 15, 2009, 14 pages.
Office Action for U.S. Appl. No. 11/334,143, Automatic Sensing Power Systems and Methods, dated Jan. 22, 2010, 13 pages.
Notice of Allowance for U.S. Appl. No. 11/752,846, Automatic Sensing Power Systems and Methods, dated Mar. 25, 2010, 9 pages.
Notice of Allowance for U.S. Appl. No. 11/777,216, Automatic Sensing Power Systems and Methods, dated Apr. 21, 2010, 6 pages.
Notice of Allowance for U.S. Appl. No. 11/931,420, Power Sampling Systems and Methods, dated Jun. 7, 2010, 8 pages.
Notice of Allowance for U.S. Appl. No. 11/931,143, Automatic Sensing Power Systems and Methods, dated Jun. 10, 2010, 6 pages.
Notice of Allowance for U.S. Appl. No. 11/931,426, Power Sampling Systems and Methods, dated Jul. 13, 2010, 9 pages.
Notice of Allowance for U.S. Appl. No. 11/334,078, Automatic Sensing Power Systems and Methods, dated Aug. 4, 2010, 6 pages.
Notice of Allowance for U.S. Appl. No. 10/983,507, Automatic Sensing Power Systems and Methods, dated Aug. 5, 2010, 6 pages.
Notice of Allowance for U.S. Appl. No. 11/777,209, Automatic Sensing Power Systems and Methods, dated Aug. 5, 2010, 6 pages.
Notice of Allowance for U.S. Appl. No. 11/777,207, Automatic Sensing Power Systems and Methods, dated Aug. 9, 2010, 6 pages.
Notice of Allowance for U.S. Appl. No. 11/777,227, Automatic Sensing Power Systems and Methods, dated Aug. 9, 2010, 6 pages.
Notice of Allowance for U.S. Appl. No. 11/777,212, Automatic Sensing Power Systems and Methods, dated Aug. 13, 2010, 6 pages.
Issue Notification for U.S. Appl. No. 11/931,310, Power Sampling Systems and Methods, dated Jun. 9, 2010, 1 page.
Issue Notification for U.S. Appl. No. 11/777,216, Automatic Sensing Power Systems and Methods, dated Aug. 18, 2010, 1 page.
Office Action for U.S. Appl. No. 11/777,217, Automatic Sensing Power Systems and Methods, dated Aug. 18, 2010, 8 pages.

* cited by examiner

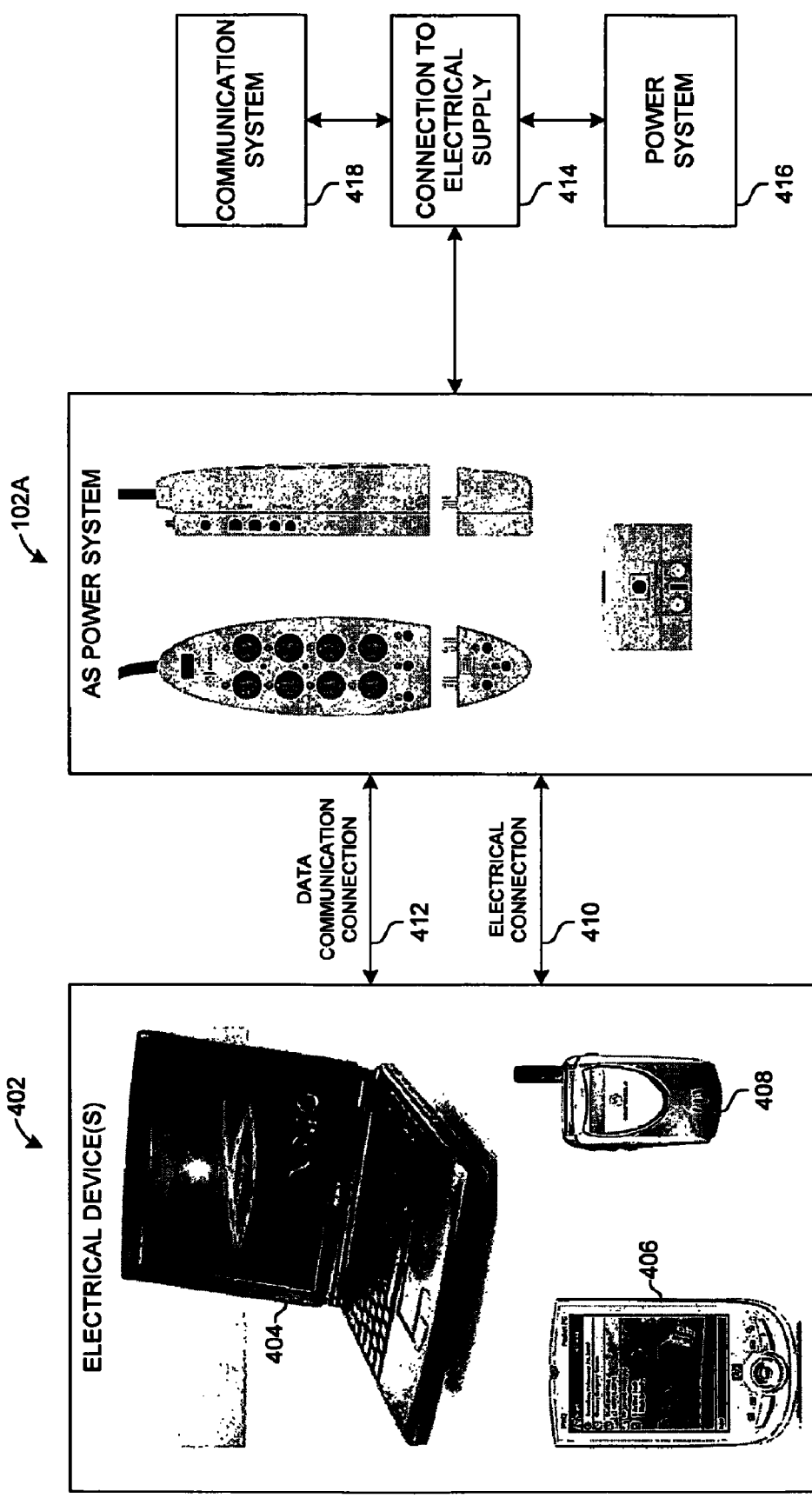

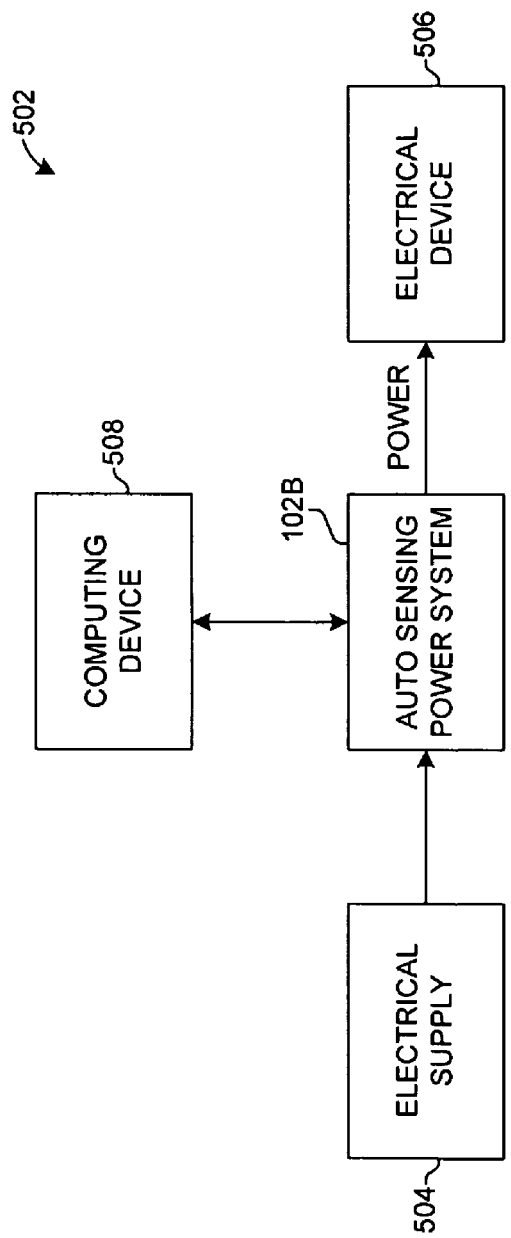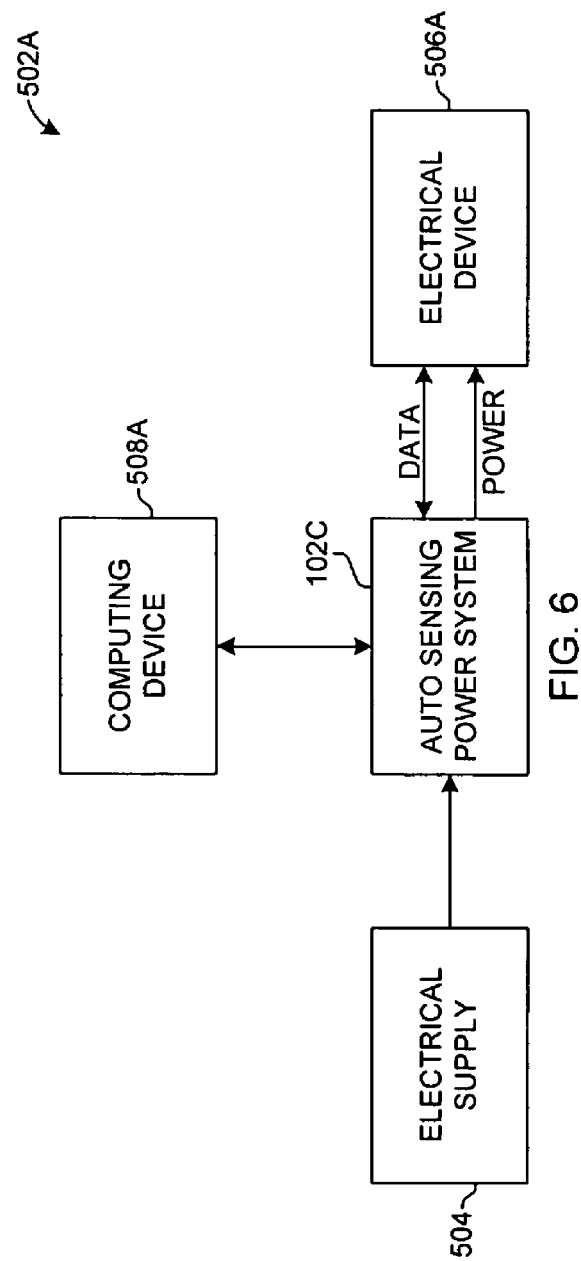

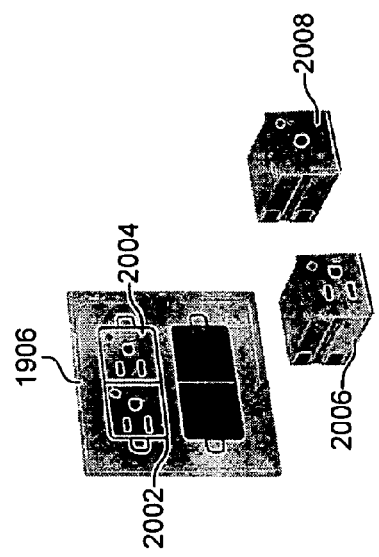
FIG. 20
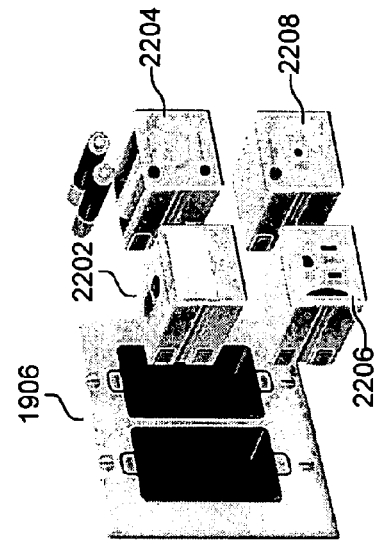
FIG. 22
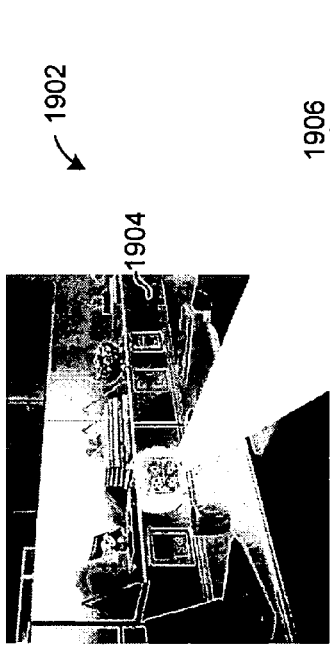
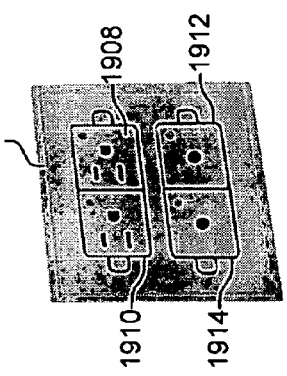
FIG. 19
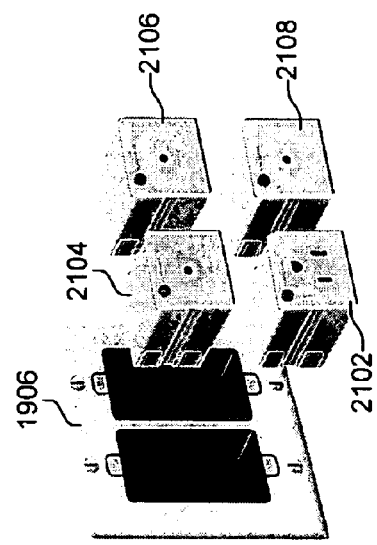
FIG. 21

AUTOMATIC SENSING POWER SYSTEMS AND METHODS

RELATED APPLICATIONS

This application is a continuation of U.S. patent application Ser. No. 10/983,507, entitled Automatic Sensing Power Systems and Methods, filed Nov. 5, 2004, which takes priority to U.S. Patent App. No. 60/518,374, filed Nov. 7, 2003, and entitled Automatic Sensing Power Systems and Methods, the entire contents of which are incorporated herein by reference, and is related to co-pending, co-owned U.S. patent application Ser. No. 11/334,143, entitled Automatic Sensing Power Systems and Methods, U.S. patent application Ser. No. 11/334,084, entitled Automatic Sensing Power Systems and Methods, U.S. patent application Ser. No. 11/334,078, entitled Automatic Sensing Power Systems and Methods, U.S. patent application Ser. No. 11/334,132, entitled Automatic Sensing Power Systems and Methods, U.S. patent application Ser. No. 11/334,094, entitled Automatic Sensing Power Systems and Methods, and U.S. patent application Ser. No. 11/334,098, entitled Automatic Sensing Power Systems and Methods, the entire contents of which are incorporated herein by reference.

FEDERALLY SPONSORED RESEARCH OR DEVELOPMENT

Not Applicable

COMPACT DISK APPENDIX

Not Applicable

BACKGROUND OF THE INVENTION

The proliferation of electronic and electrical devices is a key factor fueling an ever-increasing demand for additional alternating current (AC) outlets at home, on the road, and in the workplace. Often there are too many devices and not enough outlets. Additionally, devices including calculators, phones, and laptops use AC to direct current (DC) power converters (commonly called wall-bricks) to connect to AC power outlets. Due to their non-standard bulky form-factors, wall-bricks often take up more than one outlet, exacerbating outlet-shortage problems and driving users to seek solutions.

A popular remedy is to use multi-outlet power strips. However, these power strips provide an ineffective solution because they fail to adequately address all of the problems created by, and associated with, the increasing prevalence and use of wall-bricks.

For example, a user who owns six devices buys a power strip. While connecting the equipment, the user realizes that two devices use wall-bricks. Upon plugging the bricks into the power strip, the user discovers that only two or three of the six outlets remain open, leaving at least one outlet short. After spending $25-$200, the user expected to be able to use all the outlets, but now must buy one or more additional power strips to plug-in the remaining devices.

Low-cost power strips provide additional outlets, but do not adequately condition or stabilize incoming power, increasing the risk of equipment malfunction or outright failure. Moderate to high priced surge protectors perform well, but bulky wall-bricks often cover multiple outlets, reducing the number of devices that can be connected.

Additionally, wall-bricks often generate heat and electrical interference in addition to passing along the ambient AC conducted sags, spikes, surges, and noise generated by the power-grid and carried along AC power-lines throughout industrial, office, and residential settings. Electrical power disturbance events cause data loss and damage equipment. Wall-bricks pack and travel poorly, create cable-clutter, and are an eyesore.

Damaged equipment and downtime costs are a growing concern among users. As technology has advanced, business, commerce, home, and industrial users have become increasingly dependant on the health of the networks that supply and manipulate data and information. Additionally, the growing emphasis on network speed and the sheer volume of transactions that can take place in a fraction of a second make the prospect of downtime that much more ominous. The cost to business and industry of human or naturally caused power surges and outages has become substantially more detrimental.

It is clear from the statistical evidence that power conditioning is a vital issue and one whose importance is only going to increase. Clean, constant, noise-free power is required to ensure the proper operation, and to protect the delicate circuitry, of today's electronic and electrical devices.

Presently, systems and methods are needed that simultaneously solve outlet-shortage and transient voltage surge and noise problems. New systems and methods are needed to eliminate wall-brick issues and other identified problems.

SUMMARY OF THE INVENTION

In one embodiment, an automatic sensing system and method include a line-cord power device configured to convey power between a power source that generates alternating current (AC) power and an electrical device having a connection. The line-cord power device has an AC to direct current (DC) regulator configured to receive the AC power and to convert the AC power to DC power having a first DC voltage level. The line-cord power device also has a plurality of DC receptacles, wherein at least one DC receptacle is configured to receive the connection from the electrical device. The line-cord power device includes a processor configured to identify when the electrical device connection is connected to the at least one DC receptacle, to identify a second DC voltage level required for the electrical device, and to generate a signal to configure a DC power output to the at least one DC receptacle at the second DC voltage level. The line-cord power device also includes a DC to DC regulator configured to receive the signal from the processor and, in response thereto, to convert the DC power from the first DC voltage level to the second DC voltage level and to generate the DC power to the at least one DC receptacle at the second DC voltage level. In another embodiment, the line-cord device includes one or more AC receptacles. In another embodiment, the line-cord device has a detachable wall plug device with one or more DC receptacles and one or more AC receptacles. The detachable wall plug device is configured to connect to the line-cord device and/or to connect to the power source.

BRIEF DESCRIPTION OF THE DRAWINGS

FIG. 4 is a diagram of an automatic sensing power system communicating with one or more electrical devices and an electrical supply in accordance with an embodiment of the present invention.

FIG. 5 is a block diagram of an automatic sensing power system in accordance with an embodiment of the present invention.

FIG. 6 is a block diagram of another automatic sensing power system in accordance with an embodiment of the present invention.

FIG. 19 is a front view of a modular power receptacle in a modular wall unit in accordance with an embodiment of the present invention.

FIG. 20 is a front view of a modular wall unit with modular automatic sensing power system receptacles in accordance with an embodiment of the present invention.

FIG. 21 is a front view of modular automatic sensing power system receptacles in accordance with an embodiment of the present invention.

FIG. 22 is a front view of modular automatic sensing power system receptacles in accordance with an embodiment of the present invention.

DETAILED DESCRIPTION

The automatic sensing power systems and methods enable alternating current (AC) to direct current (DC) power conversion, DC to DC power conversion and supply, data communication, and power management. In one embodiment, an automatic sensing power system (ASPS) component is embedded in an electronic device, such as a laptop computer, and a power delivery component resides in an ASPS, such as a power strip or a receptacle.

In one embodiment, upon connection to the ASPS, the laptop communicates its power requirements to the ASPS via a power cord. The ASPS processes the request and supplies the appropriate power. Inexpensive low voltage electrical cords and modular adapters replace the wall-bricks typically supplied with cell and desk phones, personal digital assistants (PDAs), computers, mobile phones, digital cameras, cordless drills, fax machines, and other electrical devices. The ASPS is programmable and upgradeable.

The ASPS solves many problems currently encountered by home, office, and industrial consumers. The ASPS couples with single and multi-receptacle plug-in and hard-wired surge suppression devices, AC/DC power converters and transformers, and a wide-range of electronic and electrical appliances, tools, and devices.

In one embodiment, the ASPS eliminates wall-bricks by placing modular DC receptacles in a power system. The power system has AC and DC receptacles in one unit, thereby eliminating the need for multiple power strips. The power system includes communication and networking interfaces and systems over which communications may be transmitted, such as through Bluetooth, Ethernet, Firewire, and/or a USB connection. In this embodiment, the ASPS includes expanded data line protection, such as for cable, DSL, Ethernet, and modem protection. In another embodiment, the ASPS integrates gateway, network, and router capabilities. Another embodiment incorporates data communication over a broadband connection. In one example, electronic devices communicate with and through the power system via a DC connector or an AC connector.

In another embodiment, the ASPS includes a line-cord device with a detachable wall plug device. Once detached, the wall-plug device can be moved between rooms or offices or taken on the road to replace wall-bricks.

Figure 1:
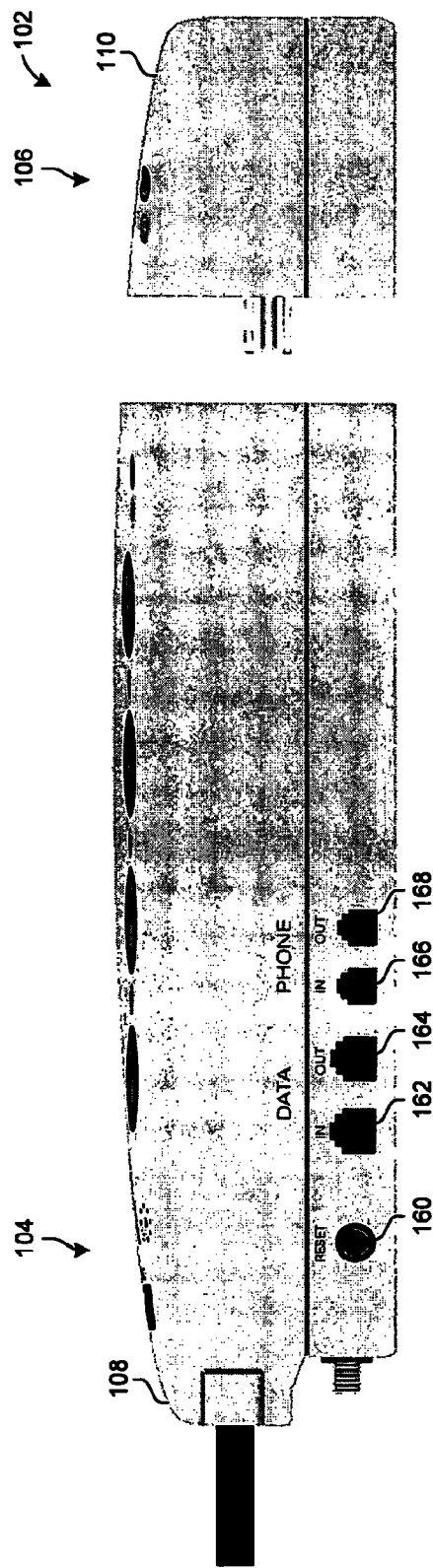
FIG. 1 is a side view of an automatic sensing power system with a detachable module in accordance with an embodiment of the present invention.
Figure 2:
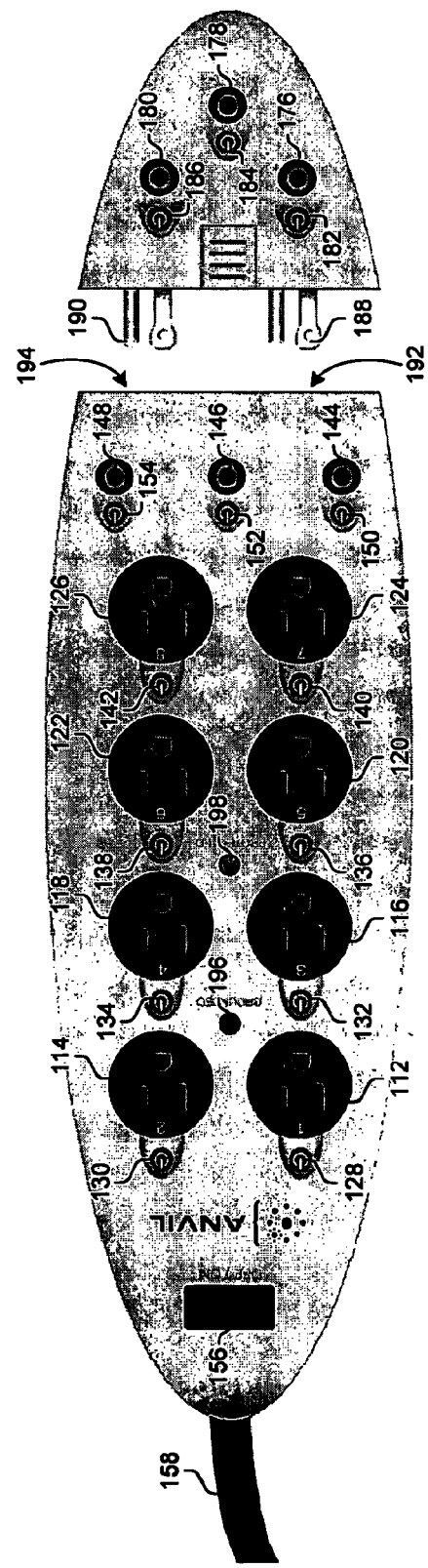
FIG. 2 is a top view of an automatic sensing power system with a detachable module in accordance with an embodiment of the present invention.
Figure 3:
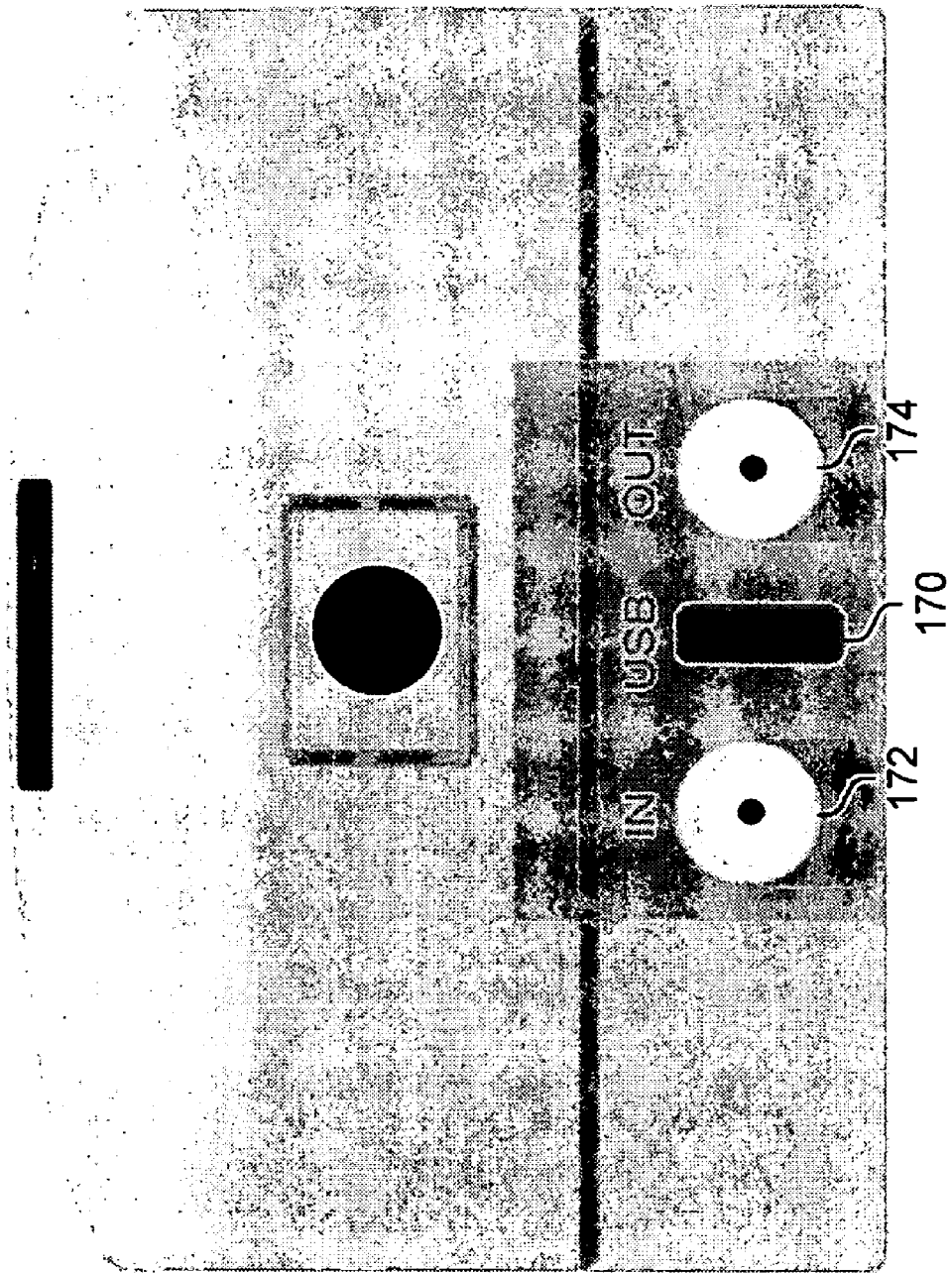
FIG. 3 is a side view of an automatic sensing power system in accordance with an embodiment of the present invention.

FIGS. 1-3 depict an exemplary embodiment of an automatic sensing power system (ASPS). In the embodiment of FIG. 1, the ASPS 102 includes a line-cord device 104 and a detachable wall plug device 106. The line-cord device 104 has a housing 108, and the detachable wall plug device 106 has a housing 110. In other embodiments, the ASPS 102 may be only a wall plug device, only a line-cord device, or a combination thereof. The ASPS 102 also may be embodied in other forms, such as a modular wall plug permanently installed or removably installed in place of a wall receptacle, an alternating current (AC) wall receptacle, or another AC or direct current (DC) device.

The ASPS 102 may be incorporated in, for example, an electronic device, such as a computer, a laptop computer, a pocket PC, a personal digital assistant (PDA), a mobile phone, a recording device, or another electrical device. As used herein, an electrical device means a device that operates using electricity, including AC and/or DC electricity. Similarly, electrical devices may use a portion of the ASPS systems identified below, including those electrical devices previously listed and other electrical devices.

Referring again to FIGS. 1-3, the line-cord device 104 includes one or more AC receptacles 112-126. Each AC receptacle 112-126 includes a power control/indicator 128-142, such as a physical or logical on/off switch used to enable or disable power flow to the associated AC receptacle 112-126. In one embodiment, the power control/indicators 128-

142 are lighted switches. In another embodiment, the lighted switches are lighted when power is enabled to the AC receptacle, and not lighted when power is not enabled to the receptacle. In another embodiment, the power control/indicator 128-142 is only an indicator, such as a light, and is not used to enable or disable power to the associated receptacle 112-126. For example, a processor within the ASPS 102 may be used to enable or disable power to a receptacle, and the power control/indicator 128-142 indicates whether or not power is enabled or disabled for that receptacle. In still another embodiment, the power control/indicator 128-142 is configured to enable and disable power to the associated receptacle, and the power control/indicator includes an indicator, such as a light, to indicate whether power is enabled for the receptacle either by the physical power control or by a processor or other system or method.

The line-cord device 104 also includes one or more automatic sensing (AS) DC receptacles 144-148. The AS DC receptacles 144-148 may be used by devices for which the power requirements, including voltage and/or amperage requirements, will be automatically determined. The power requirements for the electrical device connected to the AS DC receptacles 144-148 then will be provided to the electrical device, as will be explained more completely below.

The AS DC receptacles 144-148 also have an associated power control/indicator 150-154 such as a physical or logical on/off switch used to enable or disable power flow to the associated DC receptacle 144-148. In one embodiment, the power/control indicators 150-154 are lighted switches. In another embodiment, the lighted switches are lighted when power is enabled to the DC receptacle, and not lighted when power is not enabled to the receptacle. In another embodiment, the power control/indicator 150-154 is only an indicator, such as a light, and is not used to enable or disable power to the associated receptacle 144-148. For example, a processor within the ASPS 102 may be used to enable or disable power to a receptacle, and the power control/indicator 150-154 depicts whether or not power is enabled or disabled for that receptacle. In still another embodiment, the power control/indicator 150-154 is configured to enable and disable power to the associated receptacle, and the power control/indicator includes an indicator, such as a light, to indicate whether power is enabled for the receptacle either by the physical power control or by a processor or another system or method.

In the embodiment of FIGS. 1-3, the line-cord device 104 also has a main power control/indicator 156. The main power control/indicator 156 is used to enable or disable power to the line-cord device 104. In one embodiment, the main power control/indicator 156 includes a fuse device configured to disable power to the line-cord device 104 if power to the line-cord device exceeds selected voltage and/or selected amperage requirements. In another embodiment, the main power/control indicator 156 includes a surge protection device and/or other voltage and/or amperage protection devices.

The ASPS 102 also includes an electrical connector 158 configured to transfer power from an electrical supply to the ASPS 102. In one embodiment, the electrical connector 158 also is configured to communicate data to and from the ASPS 102.

In one embodiment, the ASPS 102 includes a reset control 160. The reset control 160 is used to reset the ASPS 102, in some instances, if a fuse or other device in the ASPS disables power to the ASPS.

In one embodiment, the ASPS 102 includes a data in port 162 and/or a data out port 164. The data ports 162-164 are used to communicate data to and from the ASPS 102, such as to a computing device, another data device, or another electrical device. The ASPS 102 may use one or more communication protocols to transfer data to and from the ASPS.

In one embodiment, the ASPS 102 includes a phone in port 166 and/or a phone out port 168. The phone ports 166-168 are used to communicate voice and/or data communications over a telephone or telephone-related communication device.

In another embodiment, as best depicted in FIG. 3, the ASPS 102 includes a data communication port 170. The data communication port 170 is used to communicate process data, control data, control instructions, update data, electrical device data, and other data with a processing device, a computing device, or another device. In one embodiment, the data communication port 170 is a universal serial bus (USB) port.

In another embodiment, other data communication connectors may be used. As best depicted in FIGS. 1 and 3, other data communication connections 172 and 174 are used to communicate data to and from the ASPS 102 in various formats and using various protocols. In one example, the data connections 172-174 include one or more cable ports, such as an in and out cable connection. Other types of data connections, networking connections, device connections, and/or device controllers may be used.

Referring again to FIGS. 1 and 2, the detachable wall plug device 106 includes AS DC receptacles 176-180. The AS DC receptacles 176-180 have an associated power control/indicator 182-186. The AS DC receptacles 176-180 and the power control/indicators 182-186 are the same as those described above.

The detachable wall plug device 106 also includes one or more electrical connectors 188-190, such as module plugs, used to transfer power to the wall plug device. The electrical connectors 188-190 connect to receiving connectors 192-194 in the line-cord device 104. AC and/or DC power is transmitted from the line-cord device 104 to the wall plug device 106 via the electrical connectors 188-190 and the receiving connectors 192-194. In some embodiments, communications, including control instructions and/or data, are transmitted from the line-cord device 104 to the wall plug device 106 via the electrical connectors 188-190 and the receiving connectors 192-194. It will be appreciated that one or more electrical connectors may be used. Additionally, while a standard 3-prong wall plug is depicted in FIGS. 1 and 2, other electrical connectors may be used.

In one embodiment, the wall plug device 106 includes a fuse device. In another embodiment, the wall plug device 106 includes a surge protection device and/or other voltage and/or amperage protection devices. In another embodiment, the wall plug device 106 includes a reset control.

In one embodiment, the ASPS 102 includes a grounded indicator 196 and/or a protected indicator 198. The grounded indicator 196 indicates that the ASPS 102 is properly grounded to an electrical supply, such as to an AC receptacle. Therefore, the ASPS 102 should provide properly grounded electrical connections for electrical devices connected to the ASPS.

The ASPS 102 also may include a protected indicator 196 in other embodiments. The protected indicator 198 indicates that surge protection and/or noise filtration systems and/or circuits are functional. In other embodiments, the wall plug device 106 includes a grounded indicator and/or a protected indicator.

FIG. 4 depicts an exemplary embodiment in which an ASPS 102A communicates with one or more electrical devices 402, including a computer 404, a PDA 406, a mobile phone 408, and/or another electrical device, via an electrical connection 410 and/or a data communication connection 412. The electrical connection 410 and/or the data communication connection 412 are depicted as logical connections. The data communication connection 412 is optional for some embodiments. In one embodiment, the electrical connection 410 and/or the data communication connection 412 both may use a single physical connection over which both power and data communications are transmitted. In another embodiment, the electrical connection 410 and/or the data communication connection 412 may use one or more physical connections.

The ASPS 102A also is connected by a connection 414 to a power system 416 and/or a communication system 418. In one example, the power system 416 is a power source for AC power. In one embodiment of FIG. 4, the ASPS 102A communicates both power and data over the same connection 414 to the power system 416. In this example, the power system 416 includes one or more of a private power system and/or a public power system. In this example, data communications are transferred to other electrical devices, such as to communications devices or computers, via the power system 416. In another example of this embodiment, data communications are transmitted to other electrical devices, such as communication devices and/or computers, via the communication system 418.

In one example, the electrical connection 410 is an AC connection. In another example, the electrical connection 410 is a DC connection. In another embodiment, the electrical connection 410 is a two-wire DC cord with a modular connector on one end and a barrel connector on the other end. In another embodiment, the electrical connection 410 is a two-wire DC cord with a modular connector on one end and configured to accept one or more adaptive connectors on the other end.

In another example, the connection 414 is connected to an electrical supply, such as an AC receptacle in a home, office, or business, to a private or public power system. In one example, the connection 414 to the electrical supply connects to a public electrical power grid. Private circuits generally connect to the electrical grid via a service entrance panel or subpanel device that may or may not require the AS communication interfaces described herein.

In another embodiment, an automatic sensing (AS) processing system, as described more completely below, resides on the ASPS 102A. In another embodiment, an AS processing system resides on the electrical device 402. In another embodiment, an AS processing system does not reside on the electrical device 402.

In still another embodiment, the electrical device 402 includes one or more of an Ethernet device, a cable device, a digital subscriber line (DSL) device, a satellite device, a dial-up device, an internet protocol (IP) device, or another device configured to communicate data, including voice communications converted to data and transferred as data via the connection 414. In still another embodiment, the data communications are transferred via the power system 416 and/or the communication system 418 to another electrical device, such an Ethernet device, a cable device, a DSL device, a satellite device, a dial-up device, an IP device, or another device configured to transmit or receive communications.

FIG. 5 depicts an exemplary embodiment of an automatic power system (APS). The APS 502 of FIG. 5 includes an automatic sensing power system (ASPS) 102B, an electrical supply 504, an electrical device 506, and a computing device 508. The ASPS 102B is used to automatically determine the power requirements of the electrical device 506, including voltage and/or amperage requirements, and supply the appropriate power to the electrical device.

In this embodiment, the electrical device 506 does not have a power converter. Instead, the electrical device 506 includes a simple electrical connector between the ASPS 102B and the electrical device. The electrical connector is not a bulky power converter, such as a wall brick. The connector may be a standard power conducting wire, such as those used for a laptop computer, a PDA, a mobile telephone, or another electrical device (without the power converter).

The ASPS 102B receives power from the electrical supply 504. Upon determining the power requirements, the ASPS 102B supplies the correct power to the electrical device 506.

The ASPS 102B communicates with the computing device 508. The computing device 508 may be a computing device, data device, or another device configured to communicate with the ASPS 102B.

In one embodiment, the computing device 508 receives status data from the ASPS 102B, including faults, breakdowns in processes, if any, surge identifications, and other status information. In another embodiment, the ASPS 102B receives data from the computing device 508. In one example, the ASPS 102B receives control data, such as configuration data, from the computing device 508.

In one example, a user uses the computing device 508 to load the power requirements of the electrical device 506 to the ASPS 102B. The ASPS 102B stores the power requirements and uses the power requirements to provide the appropriate power levels, including voltage and/or amperage levels, to the electrical device 506.

In another example, the ASPS 102B receives data from the computing device 508. The computing device 508 is configured to transmit power requirements for the electrical device 506 to the ASPS 102B. In this example, the ASPS 102B is configured to assign a particular receptacle, such as a particular DC or a particular AC receptacle, to the electrical device 506. In this example, a user may plug the electrical device 506 into a particular receptacle in the ASPS 102B, and the power requirements will be transmitted to the electrical device 506.

In one example, the computing device 508 is configured to enable the particular receptacle for the electrical device 506. In this example, the computing device 508 also is configured to disable one or more other receptacles, including one or more other AC receptacles and/or DC receptacles. In this example, disabling one or more receptacles provides a safety feature so that the electrical device 506 is not inadvertently plugged into a receptacle with the wrong power requirements, which may result in damaging the electrical device. In this example, an indicator light may indicate whether the receptacle is enabled or disabled to receive power and/or to transmit power to an electrical device.

The ASPS 102B may receive configuration data and/or control data to configure one or more receptacles. For example, the ASPS 102B may configure a first receptacle for a mobile telephone and a second receptacle for a computer. In this example, the first receptacle would provide the correct power requirements to the mobile telephone, and the second receptacle would provide the correct power requirements to the computer.

In the above example, the electrical device 506 does not require an AS processing system, as described more completely below. This embodiment provides flexibility to the user for devices not having the AS processing system.

It will be appreciated that the configuration data and/or control data may be provided to the ASPS 102B in a variety of ways. In one embodiment, the ASPS 102B receives configuration data identifying a model of a particular electrical device 506, such as a device name and/or a model name or number or another identifier. In this example, data identifying particular electrical devices and their power requirements reside on the ASPS 102B. In this example, the ASPS 102B performs a search, look up, or other process to identify the particular electronic device model and its power requirements from the data stored on the ASPS. The ASPS 102B then can provide the correct power to the electrical device 506.

In another embodiment, the ASPS 102B is configured to receive the particular power requirements, including voltage and/or amperage requirements, directly from the computing device 508. In this example, the ASPS 102B is not required to perform a search, look up, or other processing operation to identify a particular electrical device's power requirements. In this example, after receiving the configuration information, the ASPS 102B configures a particular receptacle for the power requirements.

FIG. 6 depicts another exemplary embodiment of an APS 502A. In this embodiment, the electrical device 506A includes an AS processing system. In the embodiment of FIG. 6, power is transmitted from the ASPS 102C to the electrical device 506A. Additionally, data is communicated between the ASPS 102C and the electrical device 506A.

It will be appreciated that the power and the data may be transmitted over the same physical connection, one physical connection for the power and another physical connection for the data, or multiple physical connections for the power and/or data.

In one embodiment of FIG. 6, the ASPS 102C identifies that an electrical device 506A has been plugged into one of the receptacles. This identification may be made through hardware, software, firmware, or other methods. In one example, the electrical device 506A makes a circuit when the electrical device is plugged into the receptacle. In another example, the electrical device 506A causes the receptacle to transmit a signal when the electrical device is plugged into the receptacle.

In one example, the electrical device 506A generates a power request upon being connected to the receptacle. In one example, the request includes an identification of the particular electrical device. In another example, the request includes specific power requirements for the electrical device 506A.

The ASPS 102C receives the request and determines the power requirements for the electrical device 506A. In one example, the ASPS 102C identifies the particular electrical device 506A and searches its data, such as through a look up, a search, or other determination, to identify the power requirements for the electrical device 506A. The ASPS 102C provides the appropriate power, including the appropriate voltage and amperage, to the electrical device 506A.

In another example, the ASPS 102C receives a request for power from the electrical device 506A. In this example, the request includes the specific power requirements. In this example, the ASPS 102C is not required to perform a look up, search, or other determination to identify the power requirements for the electrical device 506A. The ASPS 102C provides the power to the electrical device 506A according to the power requirements.

Figure 7:
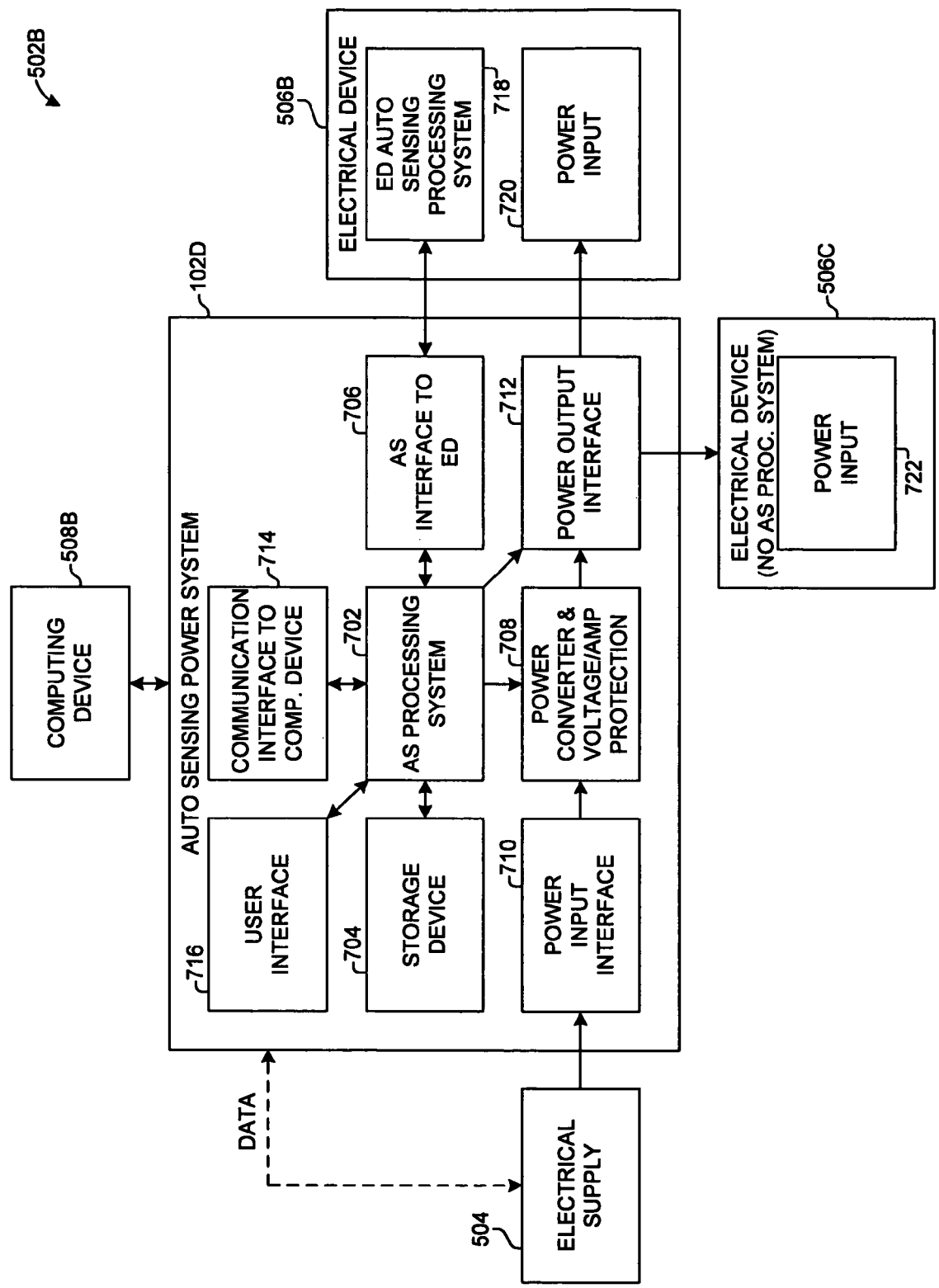
FIG. 7 is a block diagram of another automatic sensing power system in accordance with an embodiment of the present invention.

FIG. 7 depicts an exemplary embodiment of one or more processes occurring in the ASPS 102D, the electrical device 506B, and the electrical device 506C. The ASPS 102D communicates with a computing device 508B, and the ASPS 102D receives power from the electrical supply 504.

The ASPS 102D has an AS processing system 702. The AS processing system 702 controls the operations of the ASPS 102D, including data storage, power conversion, enabling and/or disabling receptacles, generating the correct power to reach receptacle, communicating with electrical devices 506B and 506C, and communicating with the computing device 508B.

In one embodiment, the AS processing system 702 stores data in, and retrieves data from, the storage device 704. The storage device 704 may include, for example, RAM, ROM, EPROM, EEPROM, Flash storage, or another storage device.

The AS processing system 702 also processes communications received from the electrical device 506B via the AS communication interface 706. The AS processing system 702 determines what action to the take based upon the communication from the electrical device 506B. The AS processing system 702 also may transmit data and/or other communications to the electrical device 506B via the AS communication interface 706B.

In one embodiment, the AS processing system 702 controls conversion of power at the power converter 708. In one example, the AS processing system 702 transmits control signals to the power converter 708 to control the power conversion and subsequent output of the converted power to one or more receptacles. In another example, the AS processing system 702 is configured to control at which receptacle the power is output from the power converter 708. For example, the AS processing system 702 may transmit a control signal to the power converter 708 requiring the power converter to output power to a selected receptacle. In another example, the power converter 708 is hard wired to one or more receptacles, and the AS processing system 702 controls hard wired switches from the power converter to one or more receptacles. In another example, the power converter 708 may otherwise output power to particular receptacles in response to control signals from the AS processing system 702.

The power converter 708 receives power from the power input interface 710. The power input interface 710 receives power from the electrical supply 504.

In one embodiment, the power converter 708 includes voltage and/or amperage protection and/or surge protectors. In another embodiment, voltage and/or amperage protection and/or surge protectors are configured between the power output interface 712 and the power converter 708 and/or the AS processing system 702.

The AS processing system 702 also controls the receptacles in the power output interface 712. The power output interface 712 includes one or more AC receptacles and/or one or more DC receptacles.

Additionally, the power output interface 712 may include one or more power control/indicators, such as those identified in FIGS. 1-3. The power control/indicators may be controlled by the AS processing system 702 or otherwise. Alternately, the power control/indicators may be hard wired to one or more receptacles. In one example, the power control/indicators may indicate that power is enabled or disabled for a particular receptacle based upon power being transferred to the control/indicator. Other examples exist. In another example, the power control/indicator is a physical switch used to disable or enable power to a particular output, regardless of any control processing by the AS processing system 702.

The AS processing system 702 also may transmit data to, and receive data from, a computing device 508B or another device via the communication interface 714. The communication interface 714 may be used to transmit and/or receive control data, configuration data, status data, or other data. In one example, the AS processing system 702 transmits and/or receives configuration data from the computing device 508B via the communication interface 714. In another example, the AS processing system 702 transmits and/or receives configuration data from the computing device 508B via the communication interface 714 and stores the configuration data in the storage device 704. The configuration data may be, for example, search data or other data used by the AS processing system 702 to identify power requirements for one or more electrical devices.

The AS processing system 702 also may transmit and/or receive other data, such as communication data, application data, video, voice communications, and other communications via the communication interface 714 to the computing device 508B or through the electrical supply 504. In one example, the electrical supply 504 includes a power supply grid. In this example, the AS processing system 702 transmits data via the communication interface 714 to the electrical supply 504 for further communication to another electrical device. In another example of this embodiment, the AS processing system 702 transmits data via the communication interface 714 to the computing device 508B.

In any of the above examples, the data transmitted by the AS processing system 702 via the communication interface 714 may be configuration data, status data, or other data used for the operation of the electrical device 506B or 506C or other information regarding the electrical devices. The data may be used by a user of the computing device 508B or another user.

The AS processing system 702 also may transmit data to, and receive data from, a computing device 508B or another device via a user interface 716. The user interface 716 generates data for display by the computing device 508B or another device. The user interface 716 may be used to transmit and/or receive control data, configuration data, status data, or other data. In one example, the user interface 716 resides on the ASPS 102D and generates data for display by the electrical device 506B. In another example, the user interface 716 resides on the electrical device 506B, and the ASPS 102D communicates with the user interface so the user interface can display data and enter control processes and operations, such as selecting a particular voltage for a particular receptacle.

In some embodiments, the communication interface 706 and the communication interface 714 are a single interface. In other examples, the communication interface 706, the communication interface 714, and/or the user interface 716 are a single interface.

In the embodiment of FIG. 7, the electrical device 506B has an electrical device automatic sensing (EDAS) processing system 718 and a power input interface 720. The EDAS processing system 718 communicates with the ASPS 102D via the AS communication interface 706. In one embodiment, the EDAS processing system 718 includes a processor. In another embodiment, the EDAS processing system 718 includes a storage device, such as an EPROM, EEPROM, Flash storage, or other storage. In another embodiment, the EDAS processing system 718 is configured with hardware, firmware, and/or software configured to communicate with the ASPS 102D and/or otherwise configure, control, transmit, receive, and/or process communications related to power requirements, statistics, and/or operational requirements of the electrical device 506B.

In one example, the EDAS processing system 718 generates a request for power to the ASPS 102D via the AS communication interface 706. In another embodiment, the EDAS processing system 718 receives a communication requesting whether or not the electrical device 506B is to receive power. In another embodiment, the EDAS processing system 718 processes instructions for transmitting power requirements to the ASPS 102D or for receiving information regarding power requirements of the electrical device 506B and the provision of power to the electrical device from the ASPS 102D.

The power input interface 720 receives power from the ASPS 102D via the power output interface 712. The power input interface 720 may be hardware, such as a plug and/or cord, and/or another device.

In the embodiment of FIG. 7, the electrical device 506C does not include an EDAS processing system. In this embodiment, data is not communicated between the electrical device 506C and the ASPS 102D. In this embodiment, the electrical device 506C receives power at the power input interface 722 from the ASPS 102D via the power output interface 712.

In one embodiment, the computing device 508B includes a configuration system used to configure the ASPS 102D. In one embodiment, the computing device 508B includes a user interface (UI) used to configure power requirements for particular electrical devices, power requirements or other configurations for particular AC and/or DC receptacles, operational parameters for the ASPS 102D, and/or other processes of the ASPS 102D.

In one example, the UI enables a user to configure particular receptacles on the ASPS 102D for particular electrical devices. The UI presents a simple screen or other output to the user, such as with radio buttons to enable or to disable particular receptacles. For example, a user may use the UI to program a DC receptacle for a mobile telephone by setting the voltage and/or amperage requirements of the mobile telephone for a selected receptacle. The user may use the GUI to program a second DC receptacle for a PDA by setting the voltage and/or amperage requirements of the PDA for a selected receptacle. In a particular embodiment of this example, the user may select an identification of the electrical device from a menu or other interface. The electrical device then may be assigned to a particular receptacle.

In another example, the particular receptacle with the associated electrical device may be enabled or disabled using a radio button or other entry on the UI. In the above example, after the user configures the first receptacle for the mobile telephone, an enable and disable button is generated for the first receptacle. After the user configures the second receptacle for the PDA, an enable and disable button is generated for the second receptacle. Once the configuration data is transmitted to the ASPS 102D, the communication connection between the ASPS 102D and the computing device 508B may be removed.

In one example, once the configuration data is downloaded to the ASPS 102D, the ASPS retains the configuration data. In another example, the ASPS 102D may be reset by the computing device 508B. In another example, the ASPS 102D configuration may be reset by a reset button, such as the reset button depicted in FIG. 1. In another example, the configuration of the ASPS 102D may be reset upon removing power from the device. Other examples exist.

Figure 8:
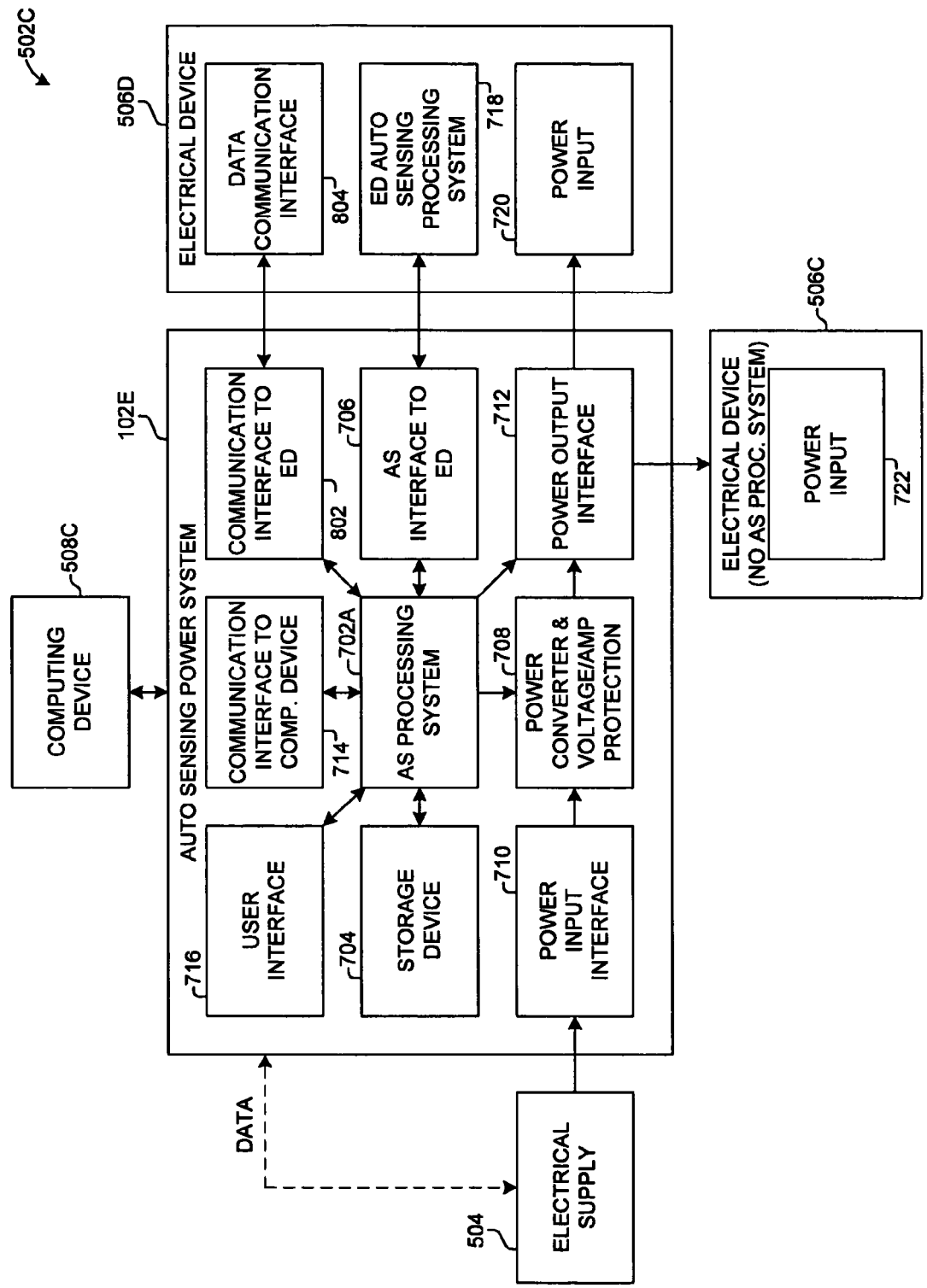
FIG. 8 is a block diagram of another automatic sensing power system in accordance with an embodiment of the present invention.

FIG. 8 depicts an exemplary embodiment of an ASPS 102E communicating with the electrical device 506D. In this embodiment, the ASPS 102E has a communication interface 802 through which it communicates to a communication interface 804 of the electrical device. The AS processing system 702A controls transmission of communications from, and reception of communications at, the communication interface 802.

In some embodiments of FIG. 8, the communication interface 706 and the communication interface 714 are a single interface. In other examples, the communication interface 706, the communication interface 714, the user interface 716, and/or the communication interface 802 are a single interface.

In this embodiment, communications normally transmitted to and from the electrical device 506D via an Ethernet connection, a cable connection, a DSL connection, a dial-up connection, an IP connection, or another type of connection through which other data may be communicated, are transmitted to the ASPS 102E for further transmission and from the ASPS to the electrical device. In this embodiment, the communications being transmitted between the electrical device 506D and the ASPS 102E may occur via one or more physical connections. The power transmitted from the ASPS 102E to the electrical device 506D may be provided over the same physical connection or another physical connection.

Figure 9:
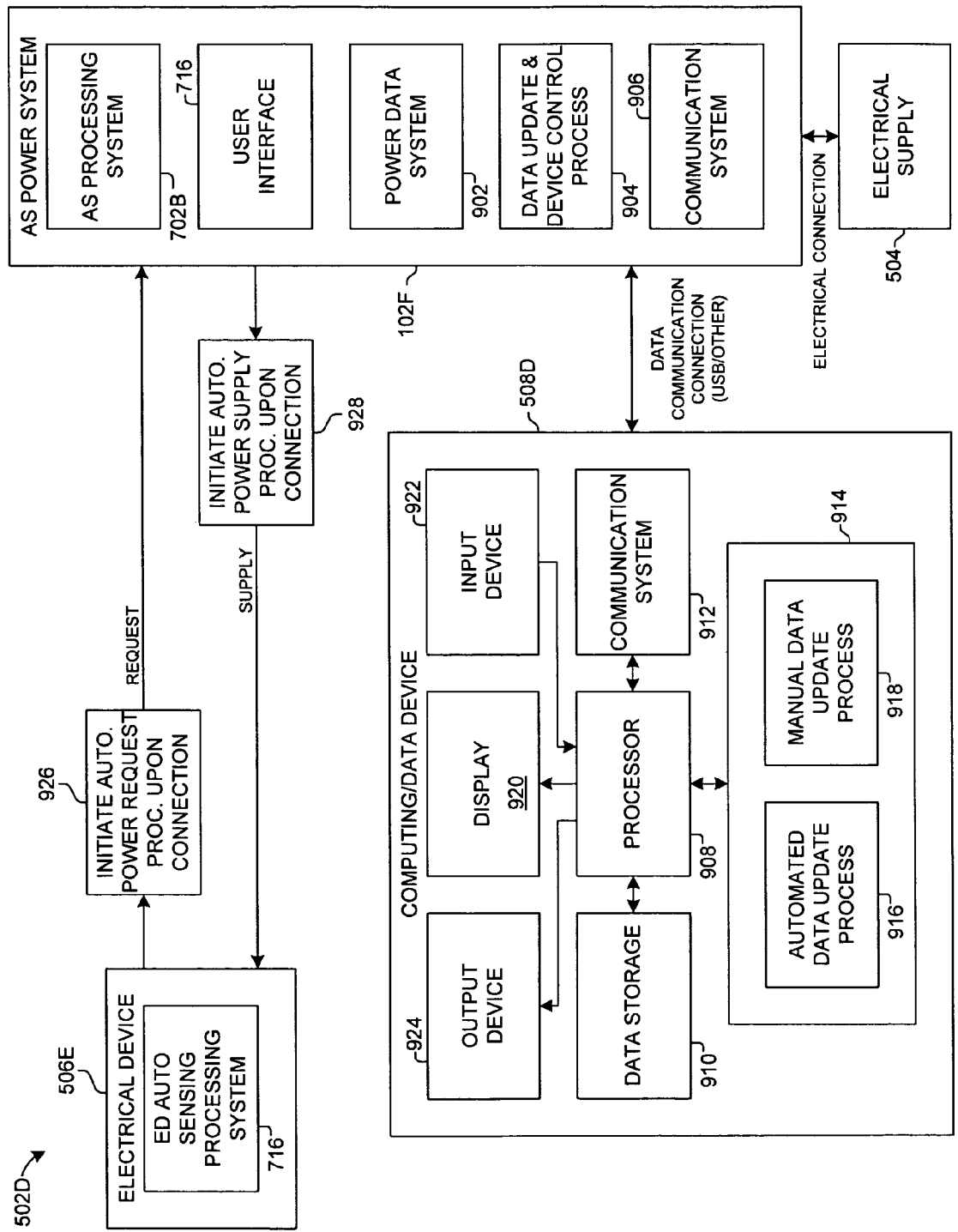
FIG. 9 is a block diagram of another automatic sensing power system communicating with a computing device and an electrical device in accordance with an embodiment of the present invention.

FIG. 9 depicts an exemplary embodiment of another ASPS 102F communicating with an electrical device 506E and a computing device 508D. The ASPS 102F includes an AS processing system 702B. The AS processing system 702B operates with a power data system 902, a data update and device control process 904, and a communication system 906.

The power data system 902 has data identifying the power requirements for one or more electrical devices. In one embodiment, the power data system 902 includes a voltage and/or amperage database that identifies the voltage and/or amperage requirements for one or more electrical devices. In this embodiment, the voltage and/or amperage database may be used with a look up or other search process by the AS processing system 702B to identify the power requirements for an electrical device. The power data system 902 may include other power related data, including configuration data and other operational data.

The data update and device control process 904 is used to automatically update information stored in the power data system 902. In one example, the data update and device control process 904 includes an automatic database update process used to automatically receive database updates from the computing device 508D and to automatically store the updated data in the power data system 902.

The communication system 906 may include a communication interface to the computing device 508D, a communication interface to the electrical device 506E, and/or another system configured to receive and/or transmit communications, including instructions and data. The communication system 906 may include one or more different types of physical connections and/or ports by which communications are received or transmitted. The communication system 906 also may operate according to one or more communication protocols to receive and/or transmit communications.

The computing device 508D includes a processor 908 used to control the processes in the computing device. In one embodiment, the processor 908 controls storage of data in, and retrieval of data from, the data storage device 910. The processor 908 also receives communications from, and transmits communications to, the communication system 912.

The processor 908 also receives data from, and transmits data to, the update system 914. The update system 914 may include an automated data update process 916 and a manual update process 918. The automated data update process 916 is configured to automatically update data, including configuration data, power requirements, and other data, for the ASPS 102F. The manual data update process 918 is configured to enable a user to manually update data, including configuration data, power requirements, and other data, to the ASPS 102F.

The processor 908 controls generation of data to the display 920, such as data for a GUI or another user interface. Additionally, the processor 908 receives data from an input device 922, such as a keyboard, a mouse, a pointer, or another input device. The processor 908 also outputs data to other output devices 924, such as a printer, another electrical device, or another device.

In one embodiment, the computing device 508D enables a user to configure the ASPS 102F, including one or more AC and/or DC receptacles on the ASPS 102F. The configuration includes enabling and disabling one or more receptacles and providing configuration data, including power requirements, to the ASPS 102F for one or more receptacles in which one or more electrical devices will be plugged.

In one embodiment, the processor 908 generates a GUI to the display 920. In another embodiment, the processor 908 generates another user interface.

In one example, the GUI or other user interface is used to display operational and event logging. In another embodiment, the GUI or other user interface is used to display device operational information and AC and/or DC receptacle controls.

In the embodiment of FIG. 9, the electrical device 506E connects to the ASPS 102F. Thereafter, the electrical device 506E initiates an automatic power request upon the connection at step 926. The ASPS 102F receives the request, processes the request, and automatically initiates the power supply to the electrical device 506E at step 928. Other examples exist.

As used in the description of FIGS. 5-9, the word "system" includes hardware, firmware, software, and/or other systems used to perform the functional and/or component operations and/or requirements. Similarly, the word "interface" includes hardware, firmware, software, and/or other systems used to perform the functional and/or component operations and/or requirements. One or more interfaces and/or systems may be separated and/or combined in the above-descriptions. Physical and/or logical components may be combined and/or separated.

Figure 10:
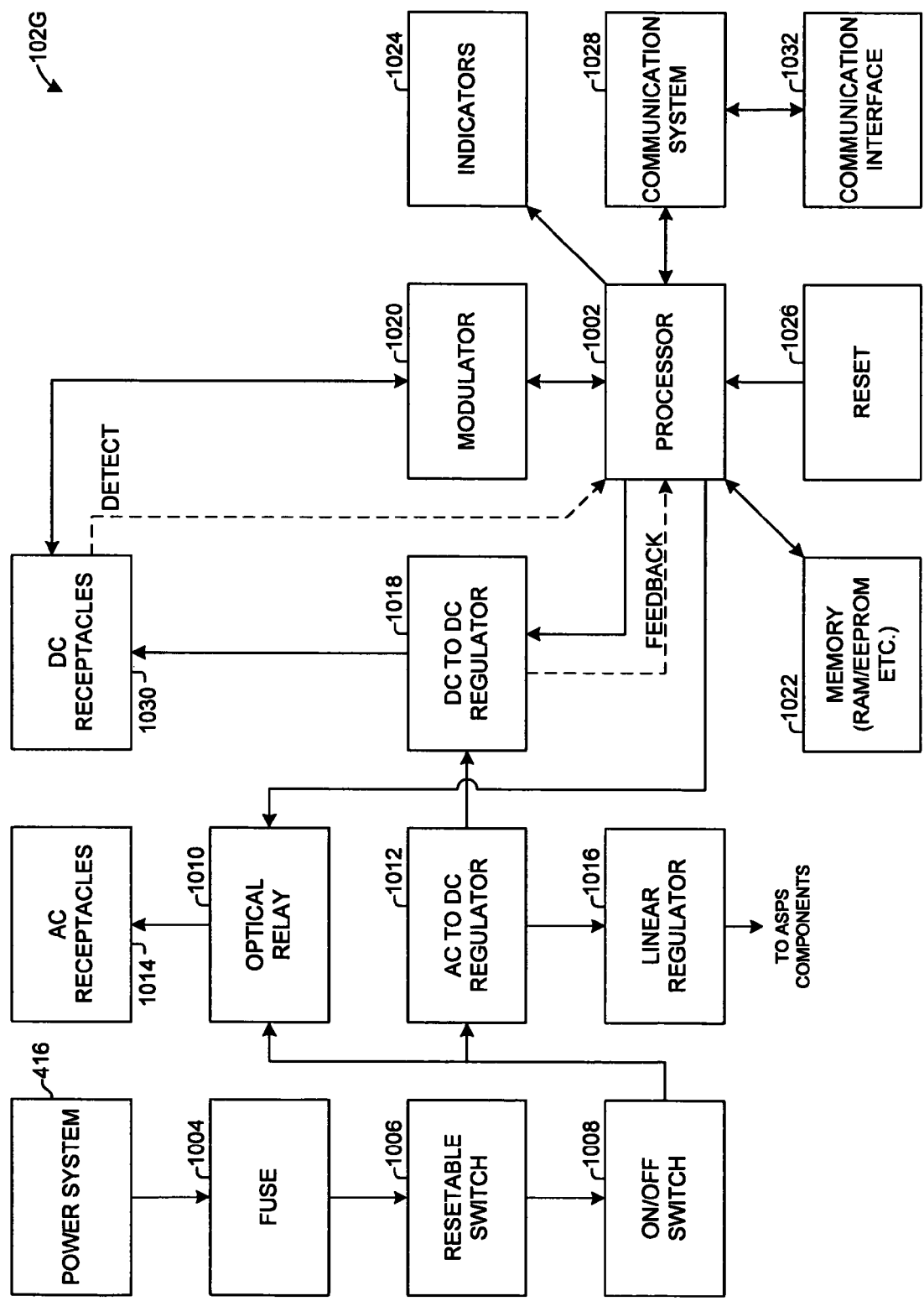
FIG. 10 is a block diagram of another automatic sensing power system in accordance with an embodiment of the present invention.

FIG. 10 depicts an exemplary embodiment of an ASPS 102G. In the embodiment of FIG. 10, a processor 1002 controls the operation of the ASPS 102G.

Power is received at the ASPS 102G from a power system 416. In the embodiment of FIG. 10, the power is received at a fuse 1004. In other embodiments, the power may be received into the ASPS 102G at a resetable switch 1006, at an on/off switch 1008, or at another component.

In the embodiment of FIG. 10, the fuse 1004 enables power to flow from the power system 416 to the ASPS 102G. The fuse 1004 terminates the flow of power into the ASPS 102G when the amperage level or another power level reaches an upper limit. In one example, the fuse 1004 opens the circuit between the power system 416 and the resetable switch 1006, or other components of the ASPS 102G, if the resetable switch is not present or when the current from the power system 416 is approximately at or exceeds 30 amps, thereby terminating the flow of electricity to the ASPS 102G. In some embodiments, the fuse 1004 is replaced after the fuse opens the circuit between the power system 416 and the resetable switch 1006 or other components. The fuse 1004 is optional in some embodiments.

The resetable switch 1006 temporarily terminates the circuit between the power system 416 and the on/off switch 1008 or other components of the ASPS 102G if the on/off switch is not present. In one example, if the on/off switch 1008 is not present, the resetable switch 1006 temporarily terminates the circuit between the power system 416 and the optical relay 1010 and the AC to DC switching regulator 1012. The resetable switch 1006 can be reset, such as by a user or automatically by another method, to close the circuit and enable power transmission to the components of the ASPS 102G. In one embodiment, the resetable switch 1006 is a circuit breaker configured to open the circuit when the current level from the power being drawn from the power system 416 is approximately at or exceeds 15 amps. The resetable switch 1006 is optional in some embodiments.

The on/off switch 1008 enables a user to manually turn power on and off for the ASPS 102G. The on/off switch 1008 may be a toggle switch, a push switch, an electronic and/or software driven switch, or another type of switch. It will be appreciated that the on/off switch 1008 may be located logically or physically in another location in the ASPS 102G, such as before or after the fuse 1004 or the resetable switch 1006. The on/off switch 1008 is optional in some embodiments.

The optical relay 1010 isolates the incoming AC power from the processor 1002 and enables the processor to control turning AC power on or off for one or more of the AC receptacles 1014. The optical relay 1010 isolates the received AC power and the transmitted AC power from connections from the processor 1002.

The optical relay 1010 receives one or more signals from the processor 1002. Based upon the one or more signals, the optical relay 1010 connects AC power to one or more of the AC receptacles 1014. In one embodiment, the optical relay 1010 connects AC power to one selected AC receptacle. In another embodiment, the optical relay 1010 connects AC power to N selected AC receptacles out of M possible AC receptacles, where N is a number greater than or equal to one, and M is a number greater than or equal to one.

In one embodiment, the optical relay 1010 is a TRIAC. In other embodiments, the optical relay 1010 is another transistor device. In other embodiments, the optical relay 1010 is another type of relay configured to isolate the processor 1002 from the incoming AC power and the outgoing AC power to the AC receptacles 1014. The optical relay 1010 is optional in some embodiments.

The AC to DC regulator 1012 receives AC power and converts the AC power to DC power. The converted DC power is transmitted to the linear regulator 1016 and to the DC to DC regulator 1018. In one embodiment, the AC to DC regulator 1012 converts 120 volt AC (VAC) power to 24 volt DC (VDC) power.

The AC receptacles 1014 are configured to transmit power from the ASPS 102G to one or more electrical devices connected to the AC receptacles. The AC receptacles 1014 include one or more AC receptacles. In one embodiment, a single AC receptacle is included in the ASPS 102G. In another embodiment, 8 AC receptacles are included in the ASPS 102G. In another embodiment, N AC receptacles are included in the ASPS 102G, where N is a number greater than or equal to one.

In one embodiment, the AC receptacles 1014 include one or more 3-prong AC receptacles. In another embodiment, the AC receptacles 1014 include one or more 2-prong AC receptacles. Other embodiments include other types of AC receptacles. The AC receptacles 1014 are optional in some embodiments.

In one embodiment, an optional switch (not shown) is included between the optical relay 1010 and the AC receptacles 1014. The optional switch enables a user to turn a selected one or more of the AC receptacles 1014 on or off. In one example, each optional switch includes one of the indicators 1024.

The linear regulator 1016 converts the DC power received from the AC to DC regulator 1012 to DC voltages required by other components in the ASPS 102G. The linear regulator 1016 provides DC voltage to integrated circuits, linear components, and other components in the ASPS 102G. In one example, the linear regulator 1016 down converts the 24 VDC voltage received from the AC to DC regulator 1012 and transmits the down-converted DC voltage to the processor 1002, the optical relay 1010, the modulator 1020, the memory 1022, the indicators 1024, the reset controller 1026, and the communication system 1028. In one embodiment, the linear regulator 1016 outputs 5 volts DC to one or more components of the ASPS 102G. In another embodiment, the linear regulator 1016 outputs N volts DC to one or more components of the ASPS 102G, where N is a number greater than or equal to 0.001.

The DC to DC regulator 1018 provides DC power to the DC receptacles 1030 at one or more voltage levels. In one example, the DC to DC regulator 1018 is an adjustable switching regulator configured to convert the 24 VDC incoming power to one or more output DC voltages. In another example, the DC to DC regulator 1018 is a synchronous adjustable switching regulator.

The DC to DC regulator 1018 receives one or more signals from the processor 1002. The DC to DC 1018 sets the output DC voltage based upon the one or more signals received from the processor 1002, and outputs the set voltage to one or more selected DC receptacles 1030. In one embodiment, the processor 1002 digitally adjusts the output of the DC to DC regulator 1018 and configures the DC to DC regulator to output the selected DC voltage to a selected DC receptacle. For example, the DC to DC regulator 1018 may receive a first signal from the processor 1002 from which the DC to DC regulator configures a first output DC voltage for 20 VDC and 4.5 amps. In another example, the DC to DC regulator 1018 receives a signal from the processor 1002 from which the DC to DC regulator configures an output DC voltage to a selected DC receptacle for 7.5 VDC and 1 amp. In another example, the DC to DC regulator 1018 receives a signal from the processor 1002 from which the DC to DC regulator 1018 configures an output DC voltage for a selected DC receptacle for 3.7 VDC and 340 milli-amps. Other examples exist.

The modulator 1020 transmits communications to and receives communications from one or more DC receptacles 1030. The modulator 1020 enables the ASPS 102G to transmit communications to an electrical device and receive communications from an electrical device over DC power carrying wire or other cable via the DC receptacles 1030. The modulator 1020 also transmits communications to and receives communications from the processor 1002.

The modulator 1020 modulates communications received from the processor 1002 for transmission to the DC receptacles 1030. The modulator 1020 also demodulates communications received from the DC receptacles 1030 for transmission to the processor 1002.

In one embodiment, the modulator 1020 modulates and demodulates communications using voltage modulation. In this embodiment, the modulator 1020 modulates the on and off states of a DC voltage to serially transmit data packets. The modulator 1020 receives voltage modulated data packets and detects the modulated data packets. In one example, the modulator 1020 reassembles the data packets to a digital form and transmits the digital data to the processor 1002. In another example, the modulator 1020 or the processor 1002 includes a voltage divider circuit that divides the voltage level of the received data to a lower range. An analog-to-digital converter then converts the divided-voltage into a digital format processable by the processor 1002.

In one example, one or more communications from the electrical device connected to the DC receptacle 1030 includes an identification string or other identification in the communication. In one embodiment, the identification string is a series of ASCII characters that correspond to data or a data structure stored in the memory 1022. The electrical device identification and/or the voltage code are stored as data in the memory 1022.

In another example, one or more communications are transmitted from and received at the modulator 1020 serially. The communications are formatted using a hexadecimal format. In this example, one or more of the following may be transmitted: a request by the ASPS 102G if an electrical device is present, an acknowledgment by the electrical device, a request for an identification code from the electronic device, an electronic device identification code, a request for a voltage code, an electrical device voltage code, an instruction to an electrical device to enable DC power for itself, a request from the ASPS for data, an electrical device data download, and other communications. In another example, one or more of the previously identified communications include ASCII characters transmitted via the hexadecimal format.

In another embodiment, the modulator 1020 transmits and receives communications using frequency shift key modulation. In this embodiment, communications are transmitted and received using a higher bandwidth.

In another embodiment, the modulator 1020 transmits and receives carrier signals that are superimposed onto the power generated from the DC to DC regulator 1018 through the DC receptacles 1030. In other embodiments, other types of modulation and/or communication may be used.

The memory 1022 includes RAM, Flash memory, EEPROM memory, and/or other memory. The memory 1022 may be used, for example, to store data, data structures, operating parameters, and/or programming, including firmware, software, and other programming.

The memory 1022 stores data received from the processor 1002. The memory 1022 also retrieves data and transmits it to the processor 1002.

In one embodiment, the memory 1022 stores product specification data for one or more electrical devices. In one example, the product specification data includes names of one or more electrical devices, model numbers of one or more electrical devices, serial numbers of one or more electrical devices, a product description of one or more electrical devices, and customer numbers for one or more electrical devices. Other data may be included.

In another embodiment, the memory 1022 includes data structures identifying voltage requirements for one or more electrical devices. The data structure also includes a designation of the electrical device, such as a model name, a model number, a serial number, or another designation.

In another embodiment, the memory 1022 includes data stored by the ASPS 102G during the operation of the ASPS. This data may include, for example, a voltage setting for a selected DC receptacle, another voltage setting for another selected DC receptacle, a voltage setting for an electrical device, another voltage setting for another electrical device, and other data. The ASPS data also may include event data, such as for power surges, selected settings for DC receptacles, states of the receptacles, critical events for the ASPS, including data identifying a blown fuse or a broken circuit, when an event occurred, and other data. Other examples exist.

In one embodiment, the memory 1022 stores one-time variables and buffer data for the processor 1002 operations. In another embodiment, the memory 1022 includes non-volatile storage for the storage of programming that is executed by the processor 1002. In another embodiment, the memory 1022 stores other non-volatile variable data, such as event data, data strings, voltage settings, and other product data.

The indicators 1024 indicate a status of one or more states and/or one or more operations for the ASPS 102G. In one embodiment, the indicators 1024 indicate a status of one or more DC receptacles 1030 and/or one or more AC receptacles 1014. In one example, the indicator is off, red, or green. If the indicator is off, the receptacle is not powered. If the indicator is green, the receptacle is powered and configured to output power to an electrical device. If the indicator is red, the receptacle is active and available to generate power to a connecting electrical device, but the receptacle is not yet generating power to the electrical device. If the indicator is red and green, an error condition exists.

The indicators 1024 receive one or more control signals from the processor 1002 and operate in accordance with the signals. In one example, a control signal causes an indicator to enable a red or green indication.

In one embodiment, the indicators 1024 are light emitting diodes (LEDs). In other embodiments, the indicators 1024 are other light emitting devices. In still other embodiments, the indicators are other types of indicating devices. The indicators 1024 are optional in some embodiments.

The reset controller 1026 resets the components on the ASPS 102G. In one embodiment, the reset controller 1026 provides a memory address to the processor 1002 at which start-up programming is stored. In another embodiment, the reset controller 1026 resets one or more DC receptacles 1030 so that the DC receptacles and the DC to DC regulator 1018 are not set for particular DC output voltages. In another embodiment, the reset controller 1026 resets the AC receptacles 1014. In another embodiment, the reset controller 1026 resets all logic components on the ASPS 102G. The reset controller 1026 is optional in some embodiments.

The communication system 1028 processes communications transmitted from, and communications received at, the communication interface 1032. The communication system 1028 formats communications to be transmitted from the ASPS 102G in a format receivable by the receiving device. The communication system 1028 formats communications received from a transmitting device connected to the ASPS 102G so that the formatted communications are processable by the processor 1002.

The communication system 1028 processes communications for various protocols. In one embodiment, the communication system 1028 processes universal serial bus (USB) based communications. In this embodiment, the communication system 1028 decodes USB data received via the communication interface 1032 and transmits the decoded data to the processor 1002. These communications may include, for example, control commands, data, and programming. The communication system 1028 also receives communications from the processor 1002 and codes the communications for transmission as USB data via the communication interface 1032. These communications may include, for example, control commands, data, and programming.

The communication system 1028 may be configured to transmit and receive communications via other protocols. For example, the communication system 1028 may be configured to transmit and receive communications as internet protocol (IP) packets, analog-based data such as voice data, digitized data, Ethernet-based data, and other types of communication system based data. Other examples exist. The communication system 1028 is optional in some embodiments.

The DC receptacles 1030 are configured to transmit power from the ASPS 102G to one or more electrical devices connected to the DC receptacles. The DC receptacles 1030 include one or more DC receptacles. In one embodiment, a single DC receptacle is included in the ASPS 102G. In another embodiment, N DC receptacles are included in the ASPS 102G, where N is a number greater than or equal to one.

In one embodiment, one or more of the DC receptacles 1030 are barrel connectors. The barrel connector includes a ground pin and power pin. The DC receptacle in this embodiment is a female barrel connector and is configured to receive a male barrel connector.

In one embodiment, the barrel connector also includes a switch and/or switch detector configured to indicate when a mating barrel connector is connected to the barrel connector of the DC receptacle 1030. The processor 1002 receives a signal from the switch detector when a mating barrel connector is connected to the connector of the DC receptacle.

In one example, the switch detector has a switch lead that is connected to a ground lead when no device is plugged into the barrel connector. The switch lead also is connected to the processor 1002, and a switch detector signal is transmitted via the switch lead to the processor. When the switch lead is connected to ground, the processor 1002 reads the switch detector signal as a logic 0, which corresponds to ground. When an electrical device is connected to the barrel connector, the switch lead is disconnected from the ground lead. The processor 1002 reads the switch detector signal as a logic 1, which indicates an electrical device is connected into the barrel connector of the DC receptacle.

In one embodiment, an optional switch (not shown) is included between the DC to DC regulator 1018 and the DC receptacles 1030. The optional switch enables a user to turn a selected one or more of the DC receptacles 1030 on or off. In one example, each optional switch includes one of the indicators 1024.

The communication interface 1032 interfaces to one or more types of communication systems. In one embodiment, the communication interface 1032 is a USB interface. In another example, the communication interface is an RJ-11 or RJ-14 telephone jack interface. In another example, the communication interface is an RJ-45 connector. In another example, the communication interface 1032 is an Ethernet-based interface. One or more of the previously referenced communication interfaces and/or one or more other interfaces may exist in a single embodiment. Other examples exist. The communication interface 1032 is optional in some embodiments.

The processor 1002 controls the operations of the ASPS 102G. The processor 1002 controls the on and off states of the AC receptacles 1014 by enabling and disabling the optical relay 1010 to connect and disconnect the AC input power for output to one or more AC receptacles. The processor 1002 transmits one or more signals to the optical relay 1010 to make or break a connection for one or more of the AC receptacles 1014.

The processor 1002 controls the on and off states of the DC receptacles 1030. The processor 1002 controls which DC receptacles 1030 will be enabled with DC power. The processor 1002 determines the DC power level that will be output from the DC to DC regulator 1018 for each DC receptacle. The processor 1002 transmits a signal to the DC to DC regulator 1018 identifying the DC power level to be output to each DC receptacle and enables the DC power output level for that DC receptacle.

The processor 1002 controls the transmission and reception of data to and from the modulator 1020. The processor 1002 receives data from the modulator 1020 and processes the data. The data may include, for example, a specific or approximate DC voltage level required by an electrical device connected to one of the DC receptacles 1030 and/or an identification of the electrical device.

The processor 1002 determines the type of communication that will be made via the modulator 1020. In one example, the processor 1002 controls the modulation of the modulator 1020 so that communications are made in a format receivable by the electrical device connected to the DC receptacle 1030. The processor 1002 also controls demodulation of the modulator 1020 so that communications received from an electrical device are transmitted in a format receivable by the modulator 1020 and processable by the processor 1002.

The processor 1002 controls the indicators 1024. The processor 1002 transmits one or more signals to one or more of the indicators 1024 for an indicator status. In one embodiment, the indicators 1024 are LEDs, and the processor 1002 enables a particular input to cause the LED to turn on. In another example, the processor 1002 enables another input of the LED to cause the LED to light a second color.

The processor 1002 controls start-up of the ASPS 102G. In addition, upon receiving a reset signal from the reset controller 1026, the processor 1002 retrieves the start-up programming from memory 1022 and resets the ASPS 102G.

The processor 1002 processes communications received via the modulator 1020 and the communication system 1028. The processor 1002 also transmits communications via the modulator 1020 and the communication system 1028.

In one embodiment, the processor 1002 generates a user interface via the communication system 1028 for display, such as for display on a computer system with a monitor. In this embodiment, the processor 1002 transmits data to the computer system for display. The data may include, for example, voltage levels required for a particular DC receptacle 1030, instructions to enable a particular DC receptacle for a particular level, instructions to enable or disable one or more AC receptacles 1014 and/or DC receptacles 1030, or other data.

In another embodiment, the user interface resides on a computer system that is communicating with the processor 1002 via the communication system 1028 and the communication interface 1032. In this embodiment, the processor 1002 transmits data to the computer system for display by the user interface. The computer system transmits data received from the user interface to the processor 1002 for processing. In this example, the data may include, for example, voltage levels required for a particular DC receptacle 1030, instructions to enable a particular DC receptacle for a particular level, instructions to enable or disable one or more AC receptacles 1014 and/or DC receptacles 1030, or other data.

In one embodiment, the processor 1002 monitors the output from the DC to DC regulator 1018 to identify the actual or approximate actual voltage being generated from the DC to DC regulator to a selected DC receptacle 1030. The raw analog voltage level generated by the DC to DC regulator 1018 is used as a feedback signal and is input back to the processor 1002. This feedback signal is indicated by the dashed-line between the processor 1002 and the DC to DC regulator 1018 in FIG. 10. In this embodiment, the processor 1002 has a voltage divider that divides the feedback signal to a lower DC voltage range, such as between 0 volts and 5 volts, samples the divided feedback signal with an analog-to-digital converter, and uses the sampled feedback signal to determine if any adjustments must be made to the output of the DC to DC regulator 1018 to maintain the proper output DC voltage. In one example, the voltage divider is a circuit having two resistors.

In one embodiment, the processor 1002 transmits an adjustment signal to the DC to DC regulator 1018 to adjust its output of a DC voltage for a particular DC receptacle 1030. In one example, the adjustment signal is an analog output signal that is used to inject an offset into the DC to DC regulator 1018. In this example, the degree of offset is linearly related to the output DC voltage of the DC to DC regulator 1018. This voltage may be expressed as Voutput=Vadjustment*Beta, with Beta=GainFactor+Tolerance. The GainFactor is a gain specific to the DC to DC regulator 1018, and its value depends upon the exact design of the DC to DC regulator. The Tolerance is a parameter used to express the production tolerance of each DC to DC regulator. Ideally, the Tolerance is 0.

The feedback loop signal enables the processor 1002 to vary Vadjustment until Voutput is equal to the DC voltage required by the electrical device connected to the particular DC receptacle. In other embodiments, the adjustment signal includes a raw digital format, rather than an analog format. Other examples exist.

In one embodiment, when an electrical device is connected to one of the DC receptacles 1030, the processor 1002 causes a minimal level of DC power to output from the DC to DC regulator 1018 to the DC receptacle. The minimal power level is enough DC power to initiate operations of the electrical device, such as operation of the electrical device's processor, but not enough DC power to fully power the electrical device. The minimal power level is low enough that it will not exceed power levels that may damage the electrical device. In this example, the minimal power level enables the processor of the electrical device to communicate with the processor 1002 of the ASPS 102G. The processor of the electrical device then is able to transmit the voltage requirements or the electrical device's identification to the processor 1002 of the ASPS 102G. The processor 1002 then configures the DC voltage level to be output from the DC to DC regulator 1018 to the DC receptacle 1030 in which the electrical device is connected and enables output of the DC power to that DC receptacle.

Figure 11:
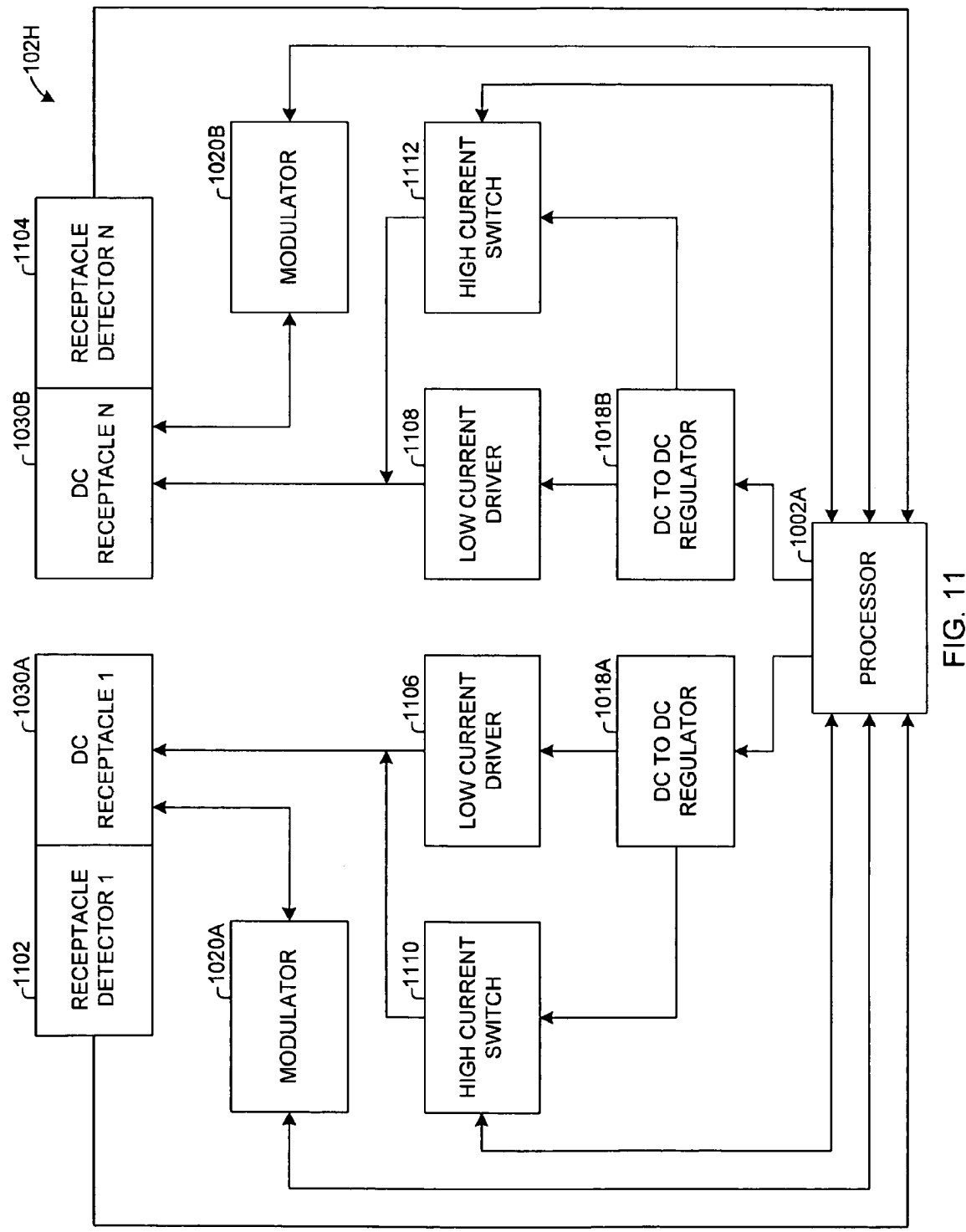
FIG. 11 is a block diagram of another automatic sensing power system in accordance with an embodiment of the present invention.

FIG. 11 depicts another exemplary embodiment of a ASPS 102H. In the embodiment of FIG. 1, the ASPS 102H includes DC receptacle 11030A through DC receptacle N 1030B. Each DC receptacle 1030A-1030B has an associated detector 1102-1104, such as a detector switch for the barrel connector described above. Other examples exist. Each detector 1102-1104 is configured to enable a signal to the processor 1002A identifying that an electrical device connector has been connected to the receptacle 1030A-1030B.

A modulator 1020A-1020B is configured to communicate between a respective DC receptacle 1030A-1030B and the processor 1002A. The processor 1002A transmits communications to the DC receptacles 1030A-1030B via the modulator 1020A-1020B and receives communications from the DC receptacles via the modulators.

A low current driver 1106 and 1108 and a high current switch 1110 and 1112 are associated with each DC receptacle 1030A-1030B. The low current drivers 1106 and 1108 receive DC power from the DC to DC regulator 1018A-1018B at a low current level and/or a low voltage level. The low current drivers 1106-1108 provide the DC power to the DC receptacles 1030A-1030B. The low current driver 1106-1108 is used to signal to the electrical device connected to the DC receptacle 1030A-1030B that the processor 1002A will transmit communications to, or receive communications from, the electrical device. In one embodiment, a low current driver 1106-1108 includes one or more resistors.

The high current switches 1110-1112 receive DC power from the DC to DC regulator 1018A-1018B at a high current level and/or a high voltage level. The high current switches 1110-1112 provide the DC power to the DC receptacles 1030A-1030B. The DC power provided by the high current switch 1110-1112 to the DC receptacle 1030A-1030B is used to charge or otherwise power the electrical device connected to the DC receptacle. In one embodiment, a high current switch 1110-1112 includes a transistor or multiple transistors configured to receive DC power from the DC to DC regulator 1018A-1018B and to receive an enable signal from the processor 1002A. Upon receiving the enable signal from the processor 1002A, the high current switch 1110-1112 transmits the DC power to the DC receptacle 1030A-1030B.

In the embodiment of FIG. 11, the processor 1002A and the modulators 1020A-1020B are configured to communicate using voltage modulation. In one embodiment, the modulator 1020A-1020B transmits communications to, and receives communications from, the DC receptacle 1030A-1030B using a hexadecimal format. In one example, one or more communications transmit ASCII-based characters using hexadecimal format.

In one embodiment, the ASPS 102H of FIG. 11 operates as follows. The DC receptacle 1030A includes a female barrel connector having a ground pin, a power pin, and a switch pin. The detector 1102 is the switch pin and switching mechanism in this example.

When a mating jack is not connected to the DC receptacle 1030A, the switching mechanism causes the switch pin to be connected to the ground lead. The switch pin also is connected to an input of the processor 1002A. When the switch pin is connected to ground, the processor reads the switch pin signal as a logic 0, which corresponds to ground.

An electrical device having a male connector is plugged into the DC female barrel connector receptacle. When the device is connected, the switch lead of the detector 1102 is disconnected from the ground lead. In this example, pull-up resistors are connected to the switch lead between the detector 1102 and the processor 1002A. When the switch lead is disconnected from ground, the detector signal transitions to a logic 1.

When the detector signal transitions to a logic 1, the processor 1002A determines that an electrical device is connected to the DC receptacle 1030A. The processor 1002A causes a low current and/or a low voltage driver signal to be generated from the DC to DC regulator 1018A through the low current driver 1106 to the DC receptacle 1030A. In this example, the low current signal is 24 volts DC and less than 5 milli-amps. The low current signal is enough power to turn on a processor for the electrical device. However, the low current signal likely does not have sufficient amperage to damage the electrical device.

The low current driver signal is an indication to the electrical device that one or more communications will be transmitted from the ASPS 102H to the electrical device. The processor 1002A transmits a query to the electrical device through the modulator 1020A and to the DC receptacle 1030A. In this example, the modulator 1020A uses voltage modulation to transmit the communication.

After the low current driver signal has been transmitted to the electrical device, the processor 1002A causes the modulator 1020A to transmit the communication to the electrical device through the DC receptacle 1030A. In this example, the processor 1002A transmits a series of enable and disable signals to the modulator 1020A. In response to the enable signals, the modulator 1020A outputs a voltage having an amplitude greater than a minimal amperage, such as 3 volts DC. The electrical device receives the voltage having the amplitude and recognizes it as a logic 1. When the modulator 1020A receives a disable signal, the modulator either outputs a voltage having a level below the minimal level or does not output any voltage at all. The electrical device identifies that the voltage is either below the minimal level or that no voltage is received at all and reads this as a logic 0. Using this method, a series of 1s and 0s are transmitted between the modulator and the electrical device as one more data packets.

The electrical device transmits a communication to the modulator 1020A through the DC receptacle 1030A, and the modulator transmits the communication to the processor 1002A. In this example, the processor 1002A has a divider circuit that divides the voltage of the communication to a lower voltage, such as voltage between 0 and 5 volts DC. The processor 1002A also has an analog-to-digital converter that samples the divided communication. The processor 1002A reads the converted signal and identifies the communication type and the data in the communication.

In this example, the communication from the electrical device is an acknowledgment indicating a status OK command. The processor 1002A transmits a message via the modulator 1020A requesting a voltage code and an identification string from the electrical device. The processor 1002A receives a communication from the electrical device via the modulator 1020A with the voltage code and the identification string for the electrical device.

The processor 1002A transmits a signal to the DC to DC regulator 1018A for the requested voltage and enables the output from the DC to DC regulator to the high current switch 1110. The processor 1002A also enables the switch for the high current switch 1110 which causes the DC power to flow from the DC to DC regulator 1018A through the high current switch 1110 and to the DC receptacle 1030A.

If the processor 1002A communicates with the electrical device while or after the electrical device receives the DC power generated from the DC to DC regulator 1018A through the high current switch 1110, the processor 1002A disables the output from the DC to DC regulator to the high current switch 1110. The processor 1002A may accomplish this by disabling the output from the DC to DC regulator 1018A, disabling the high current switch 1110, or both.

The processor 1002A then enables a low current and/or low voltage driver signal from the DC to DC regulator 1018A to the low current driver 1106. The low current driver 1106 transmits the low current driver signal to the electrical device through the DC receptacle 1030A. The low current driver signal is a signal to the electrical device that a communication will be transmitted from the processor 1002A. In this example, the processor 1002A and the electrical device operate in a master-slave relationship. In other embodiments, a polling relationship may occur between the processor 1002A and the electrical device. Other examples exist.

After the low current driver signal has been transmitted to the electrical device, the processor 1002A causes the modulator 1020A to transmit the communication to the electrical device through the DC receptacle 1030A. In this example, the processor 1002A transmits a series of enable and disable signals to the modulator 1020A. In response to the enable signals, the modulator 1020A outputs a voltage having an amplitude greater than a minimal amperage, such as 3 volts DC. The electrical device receives the voltage having the amplitude and recognizes it as a logic 1. When the modulator 1020A receives a disable signal, the modulator either outputs a voltage having a level below the minimal level or does not output any voltage at all. The electrical device identifies that the voltage is either below the minimal level or that no voltage is received at all and reads this as a logic 0. Using this method, a series of 1s and 0s are transmitted between the modulator and the electrical device as one or more data packets.

Similarly, in this example, the electrical device transmits one or more data packets to the modulator 1020A having a voltage amplitude that indicates a logic 1 or a logic 0. The voltage levels are transmitted from the modulator to the divider circuit and the analog-to-digital converter on the processor 1002A and read by the processor as a logical 0 or a logical 1.

It will be appreciated that one or more of the embodiments of FIGS. 4-11 may be embodied in a line-cord device, a wall-plug device, the line-cord device 104 of FIGS. 1-3, the detachable wall-plug device 106 of FIGS. 1-3, each of the line-cord device 104 and the detachable wall-plug device 106 of FIGS. 1-3, or another device. Alternately, portions of the embodiments of FIGS. 4-11 may be embodied in those devices. Other examples exist.

Figure 12:
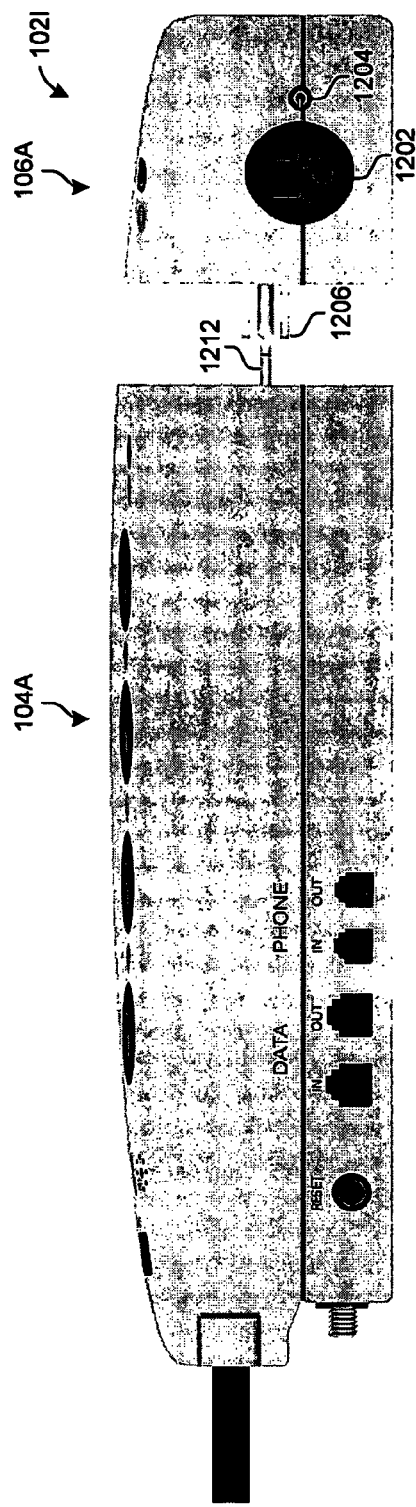
FIG. 12 is a side view of another automatic sensing power system with a detachable module in accordance with an embodiment of the present invention.
Figure 13:
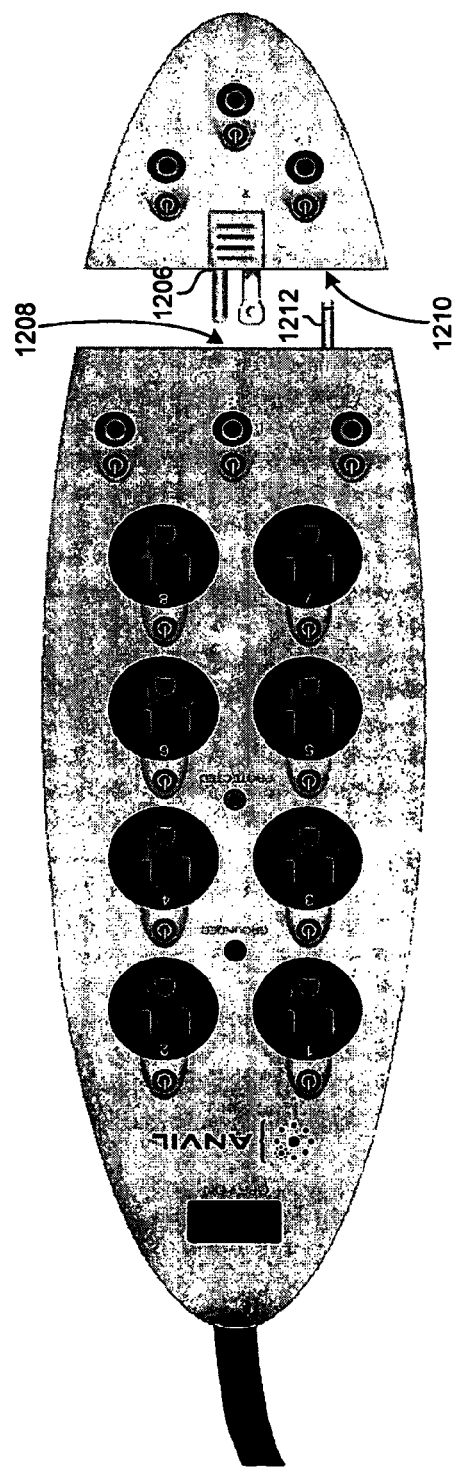
FIG. 13 is a top view of another automatic sensing power system with a detachable module in accordance with another embodiment of the present invention.
Figure 14:
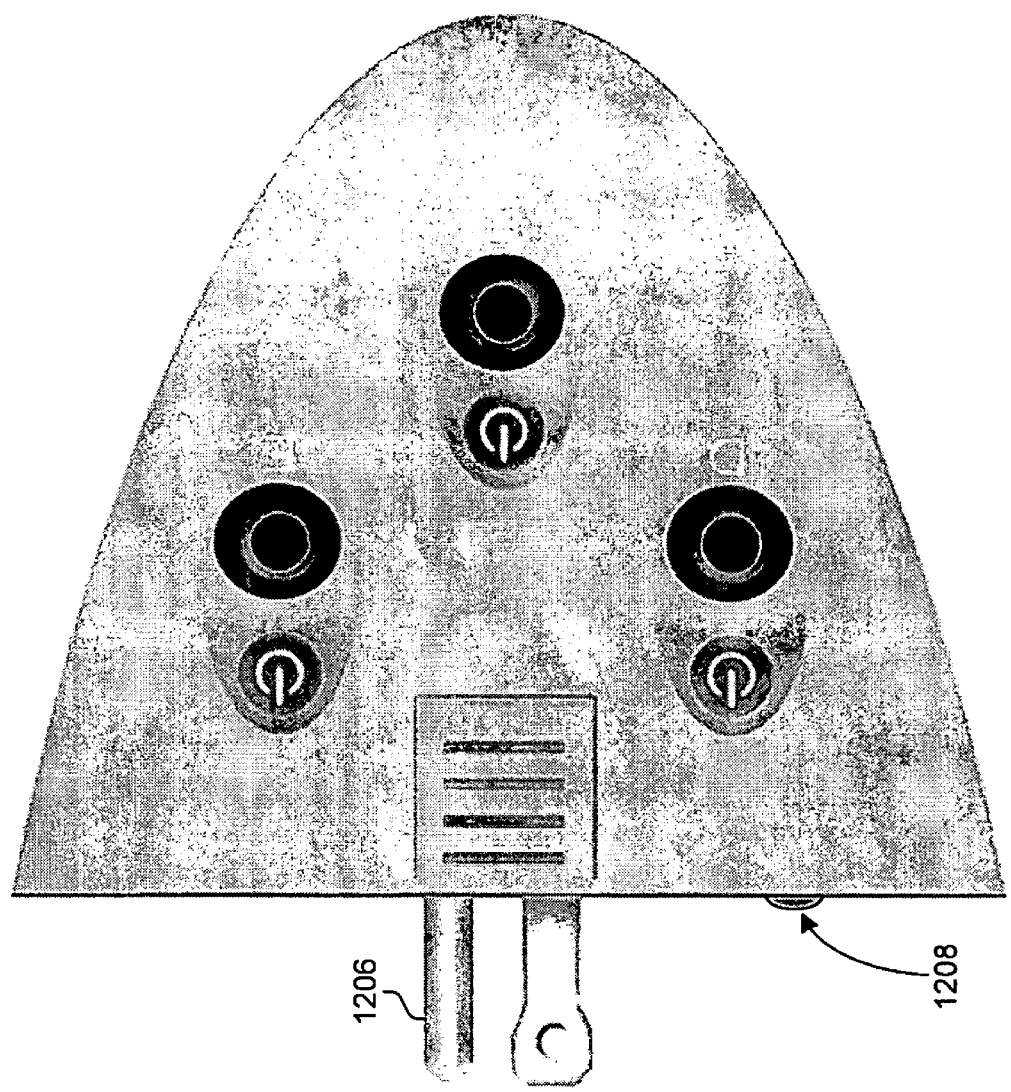
FIG. 14 is a side view of another automatic sensing power system in accordance with an embodiment of the present invention.

FIGS. 12-14 depict another exemplary embodiment of an ASPS 102I. In the embodiment of FIGS. 12-14, the detachable wall plug device 106A includes an AC receptacle 1202. In some embodiments, the AC receptacle 1202 has an associated power control/indicator 1204.

The wall plug device 106A also includes a single electrical connector 1206. The electrical connector 1206 connects to a receiving connector 1208 in the line-cord device 104A. AC and/or DC power is transmitted from the line-cord device 104A to the wall plug device 106A via the electrical connector 1206 and the receiving connector 1208. In some embodiments, communications, including control instructions and/or data, are transmitted from the line-cord device 104A to the wall plug device 106A via the electrical connector 1206 and the receiving connector 1208. In one embodiment, the electrical connector 1206 is a 3-prong electrical plug. In other embodiments, other types of electrical connectors may be used.

The wall plug device 106A also includes a communication interface 1210. The communication interface 1210 is configured to communicate with a corresponding communication interface 1212 in the line-cord device 104A. In one embodiment, the communication interface 1210 is a female connector, and the corresponding communication interface 1212 is a male connector configured to mate with the female connector. In one embodiment, the corresponding communication interface 1212 is a foldable male connector that folds down or to the side when not in use. In one example, the foldable male connector locks into place when in use.

In the embodiment of FIGS. 12-14, communications may be transmitted between the line-cord device 104A and the wall plug device 106A via the communication interfaces 1210 and 1212. Alternately, communications may be transmitted via the electrical connector 1206.

It will be appreciated that one or more of the embodiments of FIGS. 4-11 may be embodied in a line-cord device, a wall-plug device, the line-cord device 104A of FIGS. 12-14, the detachable wall-plug device 106A of FIGS. 12-14, each of the line-cord device 104A and the detachable wall-plug device 106A of FIGS. 12-14, or another device. Alternately, portions of the embodiments of FIGS. 4-11 may be embodied in those devices. Other examples exist.

Figure 15:
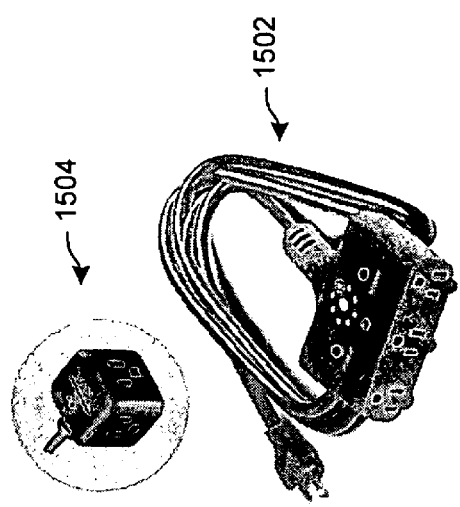
FIG. 15 is a top view of a line-cord automatic sensing device in accordance with an embodiment of the present invention.

FIGS. 15-22 depict other embodiments of an automatic sensing power system and/or an automatic power system. FIG. 15 depicts an embodiment in which line-cord devices 1502 and 1504 incorporate the automatic sensing power system.

Figure 16:
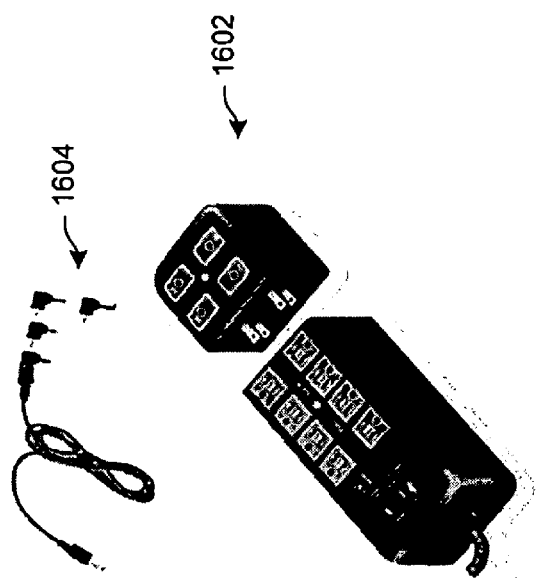
FIG. 16 is a top view of another line-cord automatic sensing device with a connector and adaptors in accordance with an embodiment of the present invention.

FIG. 16 depicts another embodiment of an automatic sensing power system 1602, including AC receptacles, DC receptacles, and a detachable module, such as the detachable wall plug device. FIG. 16 also depicts an exemplary embodiment of one type of electrical modular connector 1604 that may be used in connection with the automatic sensing power system, including the receptacles, electrical cords, and/or connectors and adaptors.

Figure 17:
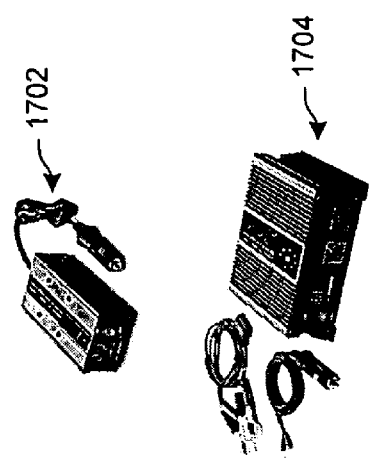
FIG. 17 is a top view of other line-cord automatic sensing devices with connectors and DC adaptors in accordance with an embodiment of the present invention.

FIG. 17 depicts an exemplary embodiment that incorporates an automatic sensing power system 1702 and 1704 in a device that may be plugged into a vehicle receptacle.

Figure 18:
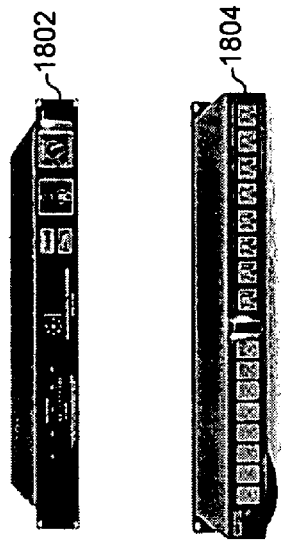
FIG. 18 is a front view of rack/cabinet mount automatic sensing devices in accordance with an embodiment of the present invention.

FIG. 18 depicts another embodiment in which AC receptacles and DC receptacles are used in a rack mount 1802 and a cabinet mount 1804 automatic sensing power system.

FIGS. 19-22 depict various modular devices using the automatic sensing power system. FIG. 19, for example, depicts a modular unit 1902 installed in a wall 1904, such as a modular wall receptacle junction box 1906. The modular wall receptacle junction box 1906 of FIG. 19 includes both AC and DC modular receptacles 1908-1910 and 1912-1914, respectively.

FIG. 20 depicts removable modular receptacles that may be removably installed in a modular wall receptacle junction box 1906. FIG. 20 depicts various modules 2002-2008 that may be interchangeably placed in a modular wall receptacle junction box 1906.

FIG. 21 depicts other wall modules 2102-2108 that may be interchangeably and removably installed in modular wall receptacle junction box 1906. The example of FIG. 21 includes an AC receptacle 2102 and DC receptacles 2104-2108, each of which include a grounded indicator and/or a protected indicator and/or an enabled or disabled indicator.

FIG. 22 depicts exemplary embodiments of modular power receptacles that may be installed in a modular wall receptacle junction box 1906. Each of the modular power receptacles may include a grounded indicator, a protected indicator, and/or an enabled/disabled power indicator. The examples of FIG. 22 include a lighting module 2202, a battery recharge module 2204, a dimmer module 2206 for dimming control of the power output from the dimmer module, and a DC power module 2208 with surge suppression.

FIGS. 23-43 depict an exemplary embodiment of a user interface (UI) 2302. The UI enables a user to determine if an electrical device is connected to the ASPS. In the embodiment of FIGS. 23-43, an electrical device is referred to as an automatic sensing-direct current and automatic synchronous-data communication (asDC) device, and the ASPS is referred to as an intelligent power hub.

The UI enables a user to select the voltage to be transmitted from the ASPS to an electrical device and to select the DC receptacle to which it will be generated. The UI also enables a user to turn one or more AC receptacles and/or DC receptacles on or off. For exemplary purposes, the UI of FIGS. 23-43 is directed to only one AC receptacle (identified as an AC port on the UI) and only one DC receptacle (identified as a DC port on the UI). However, other UIs may enable selection of multiple AC receptacles and multiple DC receptacles.

Additionally, a computer is connected to the power hub through a USB connection in the embodiments of FIGS. 23-43. The UI in this embodiment is generated through the host computer and displayable on the computer's display.

Figure 23:
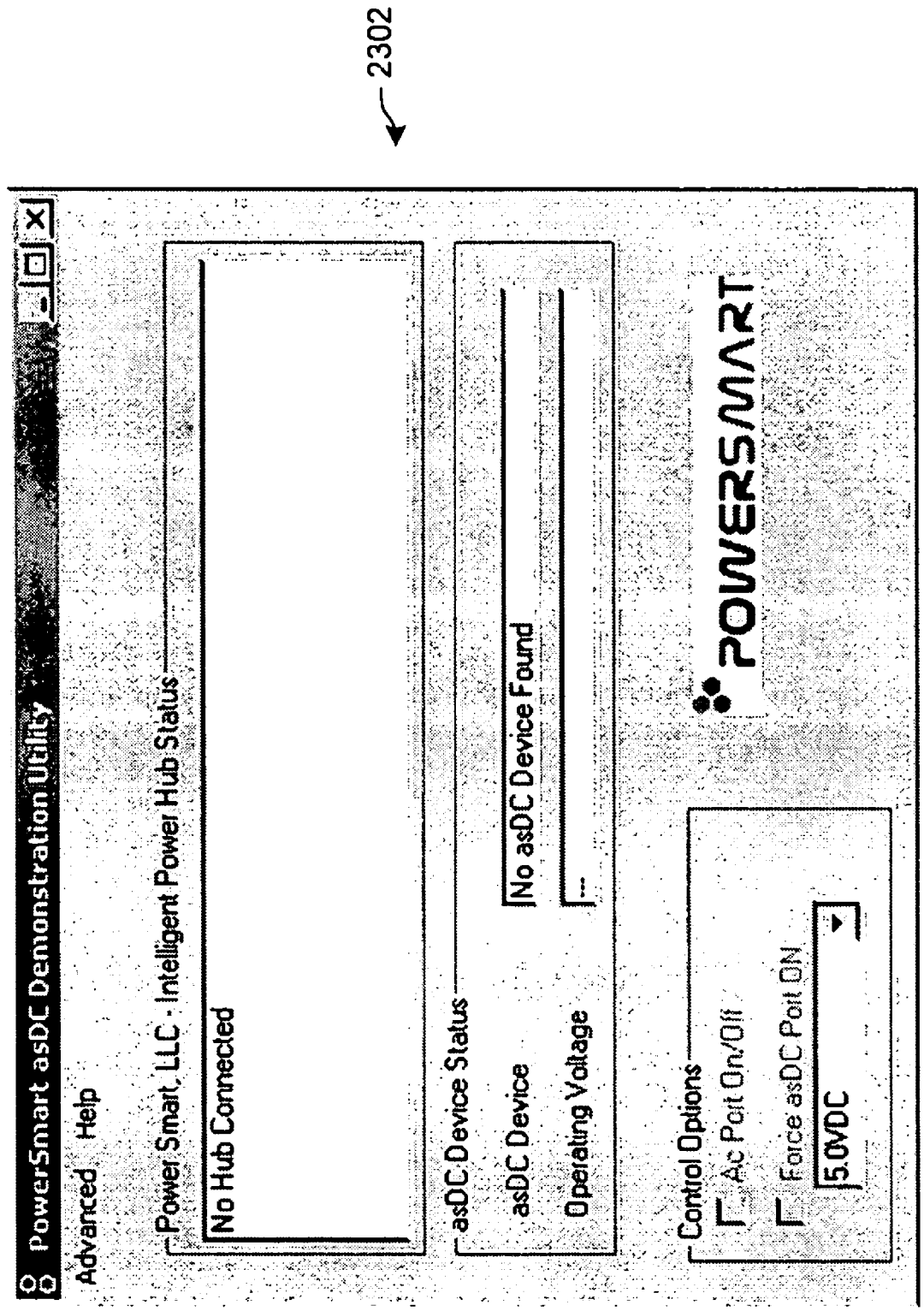
FIGS. 23-43 are screen views of a user interface used with an automatic sensing power system in accordance with an embodiment of the present invention.
Figure 24:
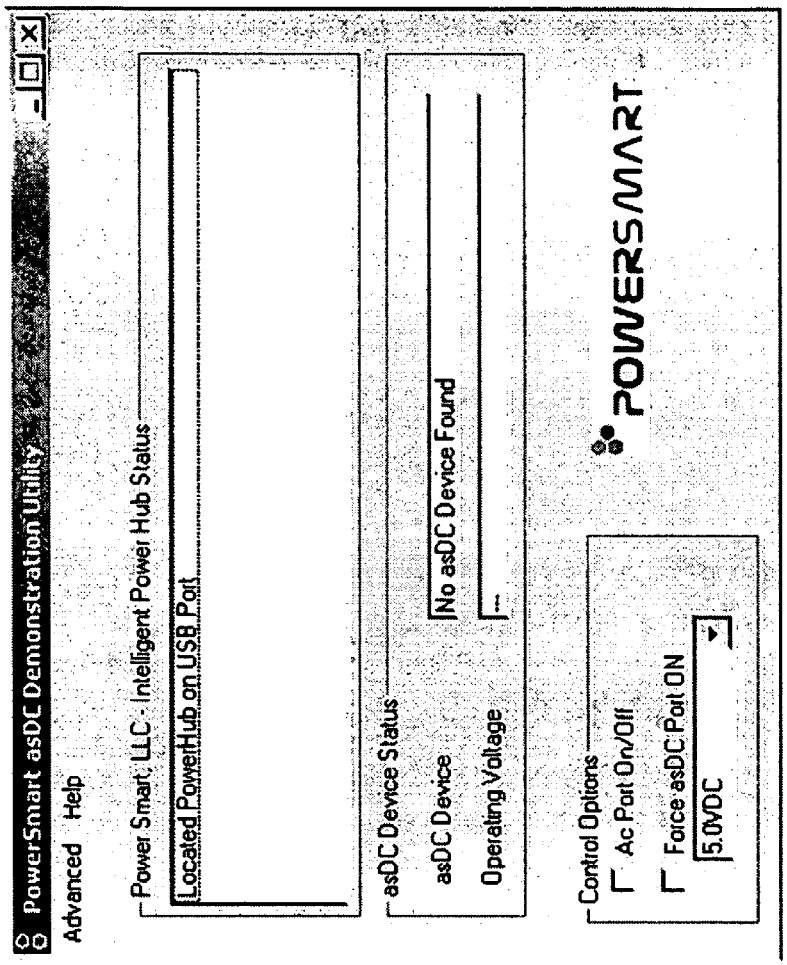

When the computer is not connected to the power hub, the UI indicates that no power hub is connected to the computer and no asDC device is connected to the power hub, as depicted in FIG. 23. When the power hub is connected to the computer, the UI indicates that the power hub is connected to the computer via the USB port, as depicted in FIG. 24.

Figure 25:
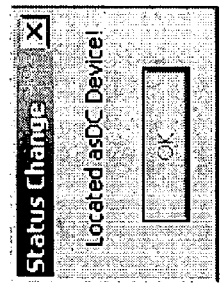
Figure 26:
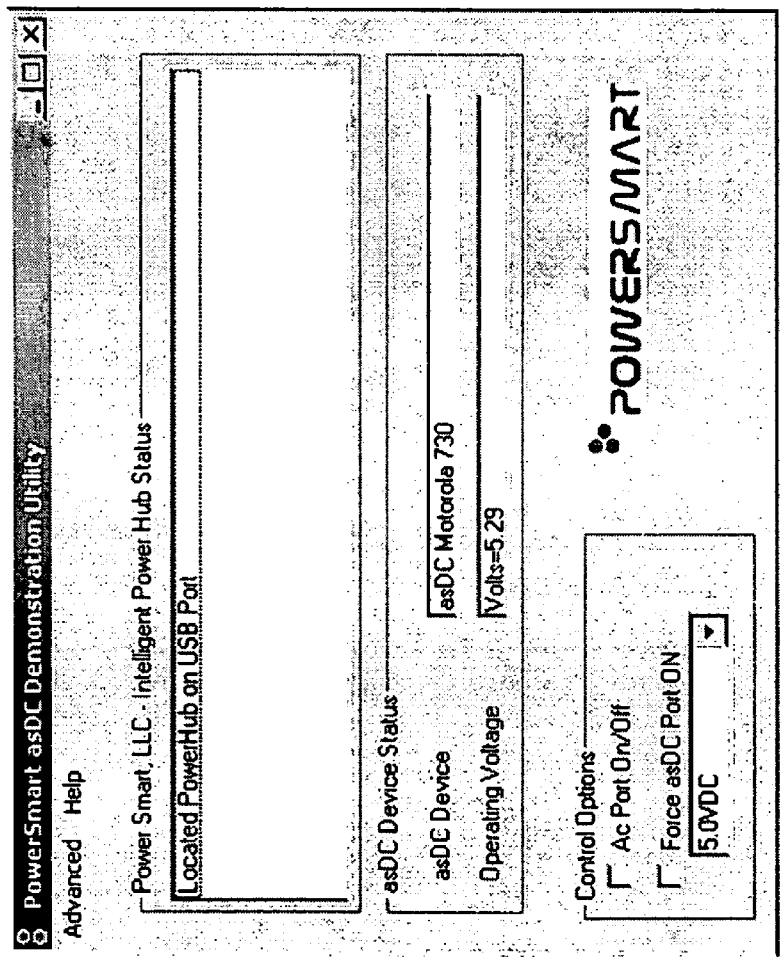

As depicted in FIG. 25, when an asDC device is connected to the power hub, a window is displayed with the status change. The user selects the "OK" button on the status change window, and the status change window disappears. In other embodiments, the status window briefly appears and automatically disappears after a selected period of time. The asDC device status indicates that an asDC device was identified, as depicted in FIG. 26. The asDC device identification is specified by values in two fields, including a name or identity field and an operating voltage field. In the example of FIG. 26, the name or identity field may contain a string of up to forty characters. In this example, the device is identified as an "asDC Motorola 730" having an operating voltage of 5.29 volts DC. Other examples exist.

Figure 27:
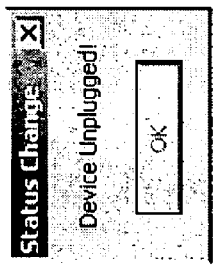
Figure 28:
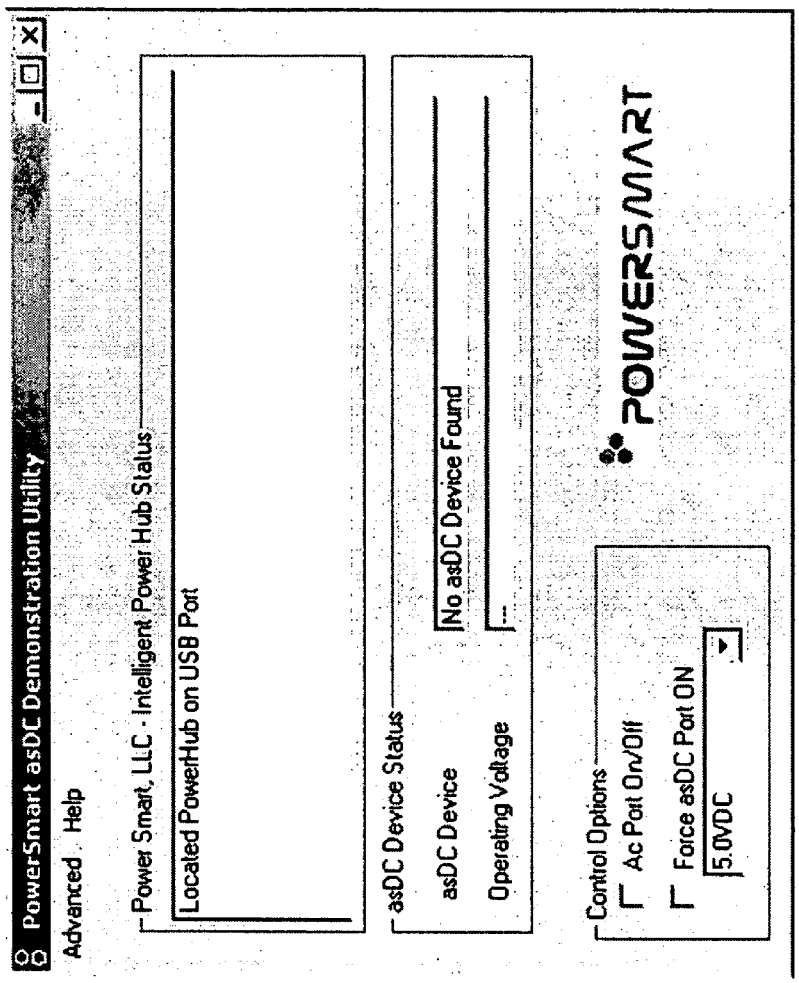

When the asDC device is disconnected from the power hub, a status change window is generated, as depicted in FIG. 27. The device status indicates that no asDC device is connected to the power hub, as indicated in FIG. 28.

Figure 29:
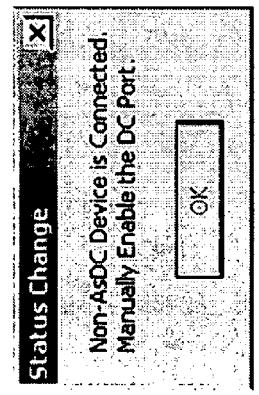

An electrical device that is not configured to communicate with the power hub is referred to as a non-asDC device. If a non-asDC device is connected to the power hub, a status change window indicates that the non-asDC device is connected to the power hub, as indicated in FIG. 29. The status change window suggests that the user manually enable a DC receptacle.

Figure 30:
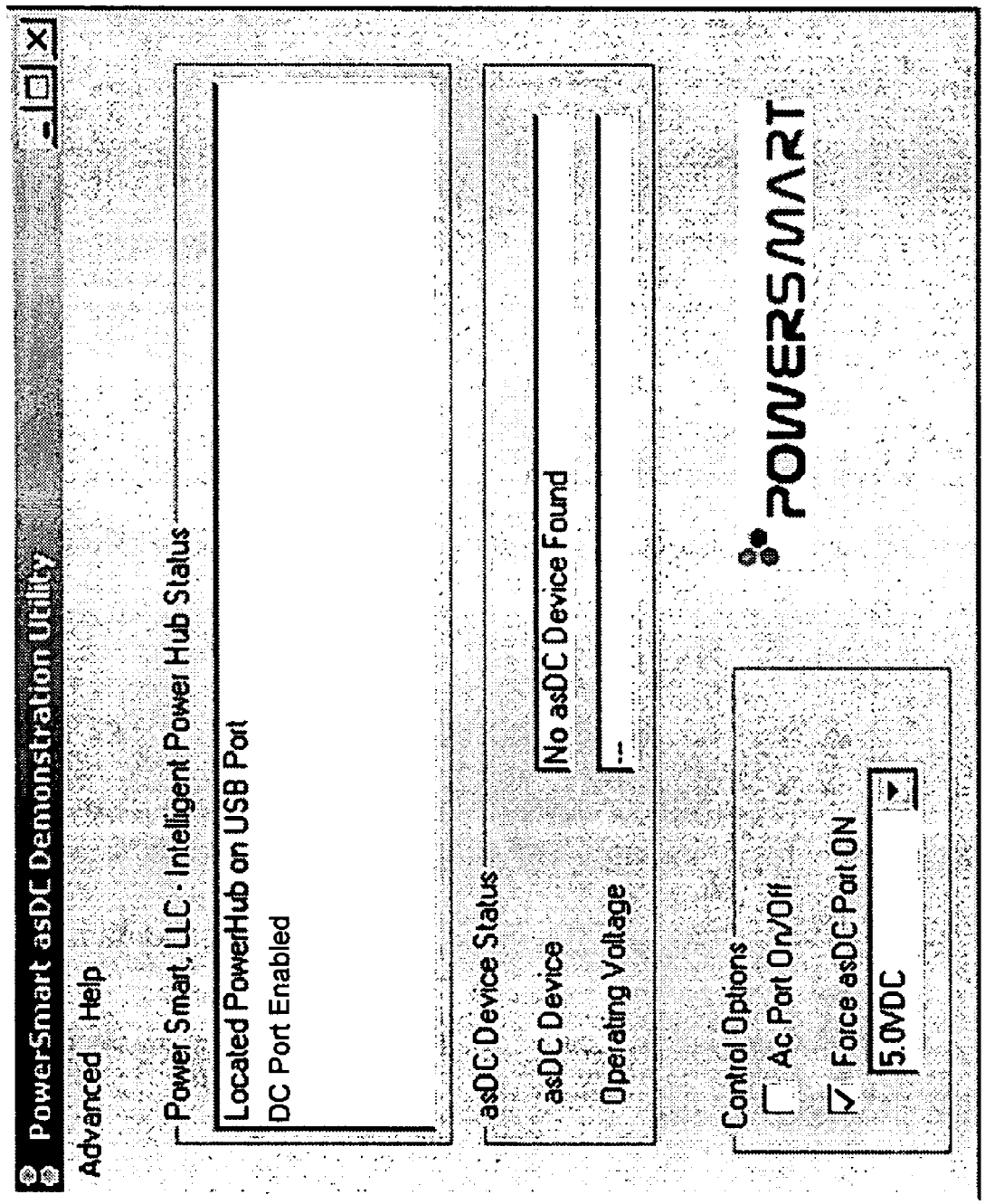

The user may select a voltage to be output to a selected DC receptacle, as depicted in FIG. 30. In this example, the user selected the voltage level to be output to the selected DC receptacle. The user then selected the "force asDC port ON" to set the DC receptacle to the selected voltage level.

Figure 31:
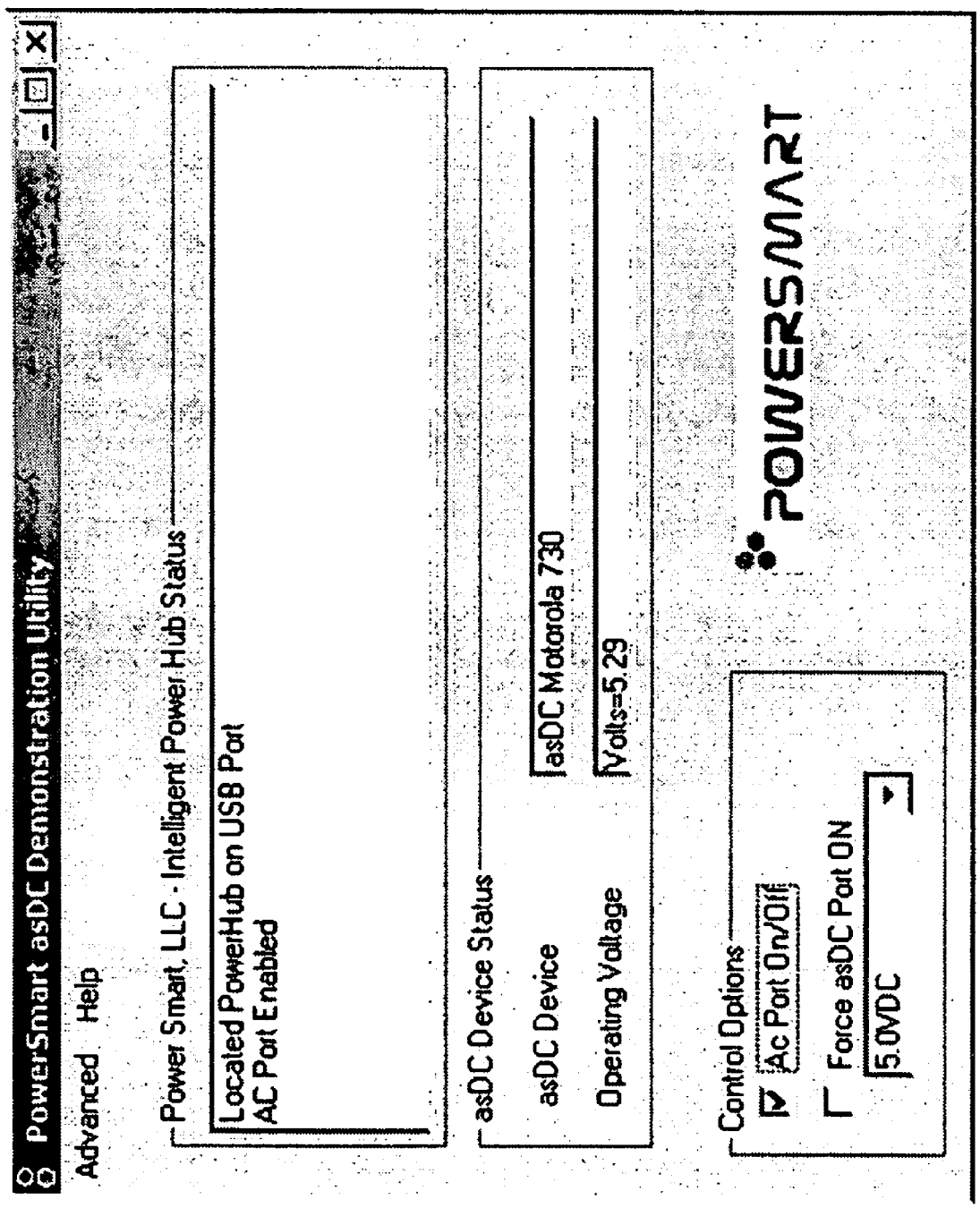

The user may elect to turn the AC receptacle on or off, as depicted in FIG. 31. If the user selects the check box for "AC port on/off," the user may turn the receptacle on and off. When the AC receptacle is turned on, the power hub status window indicates that the AC port was enabled.

Figure 32:
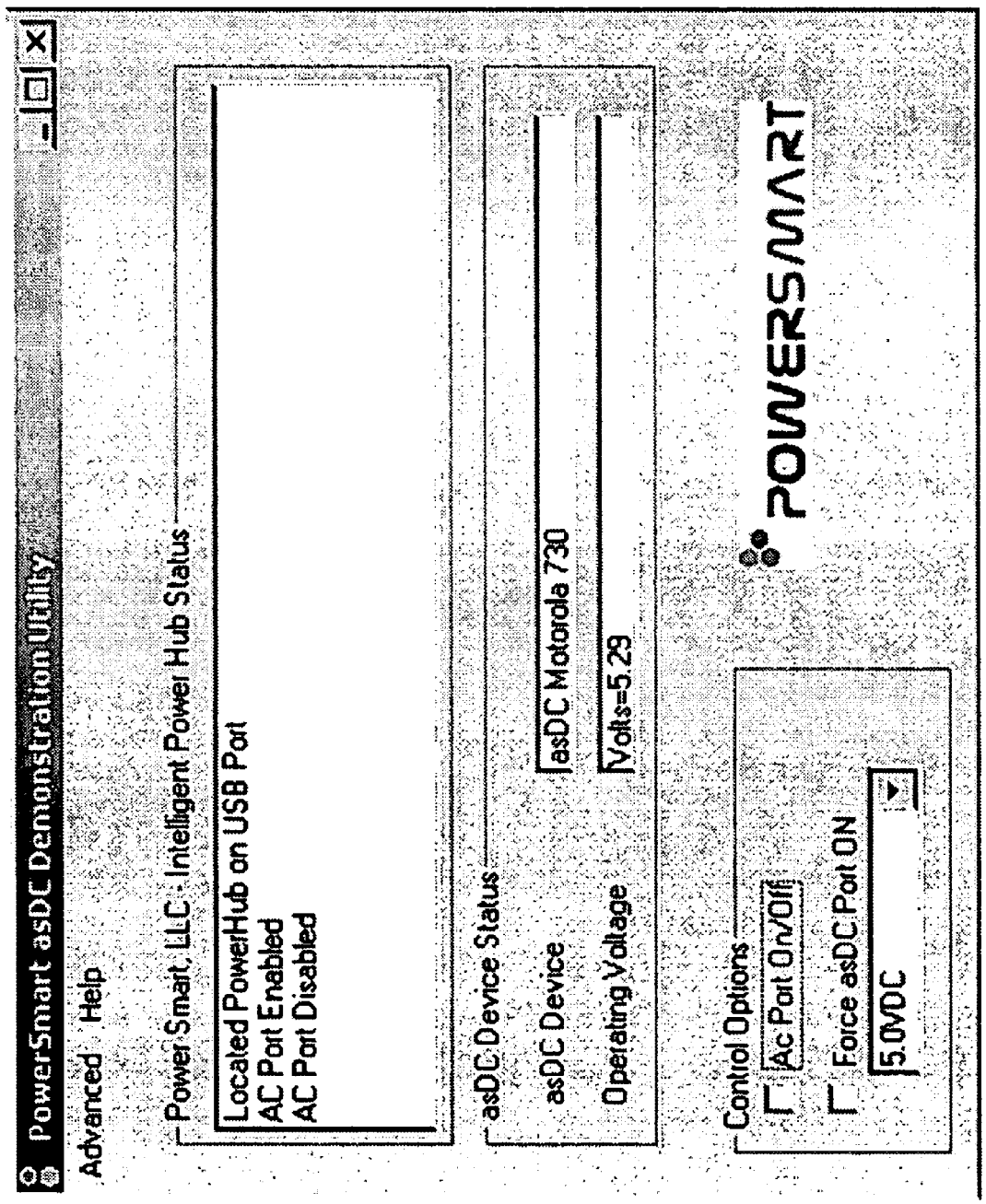

If the user again selects the check box for the AC port on/off, the AC power for the AC receptacle is turned off. The check mark from the check box disappears, and a new line is entered for the power hub status indicating that the AC port is disabled, as depicted in FIG. 32.

Figure 33:
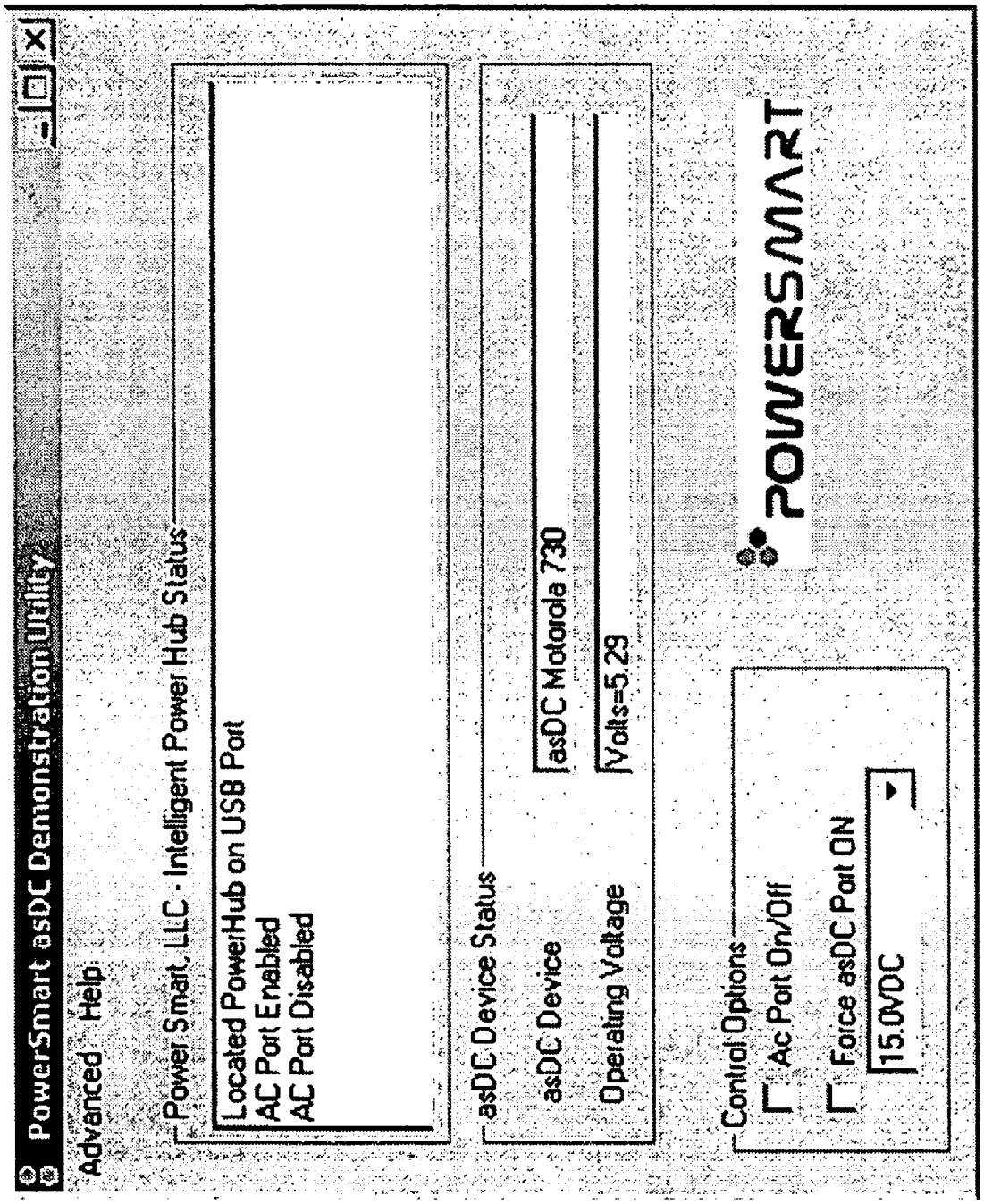
Figure 34:
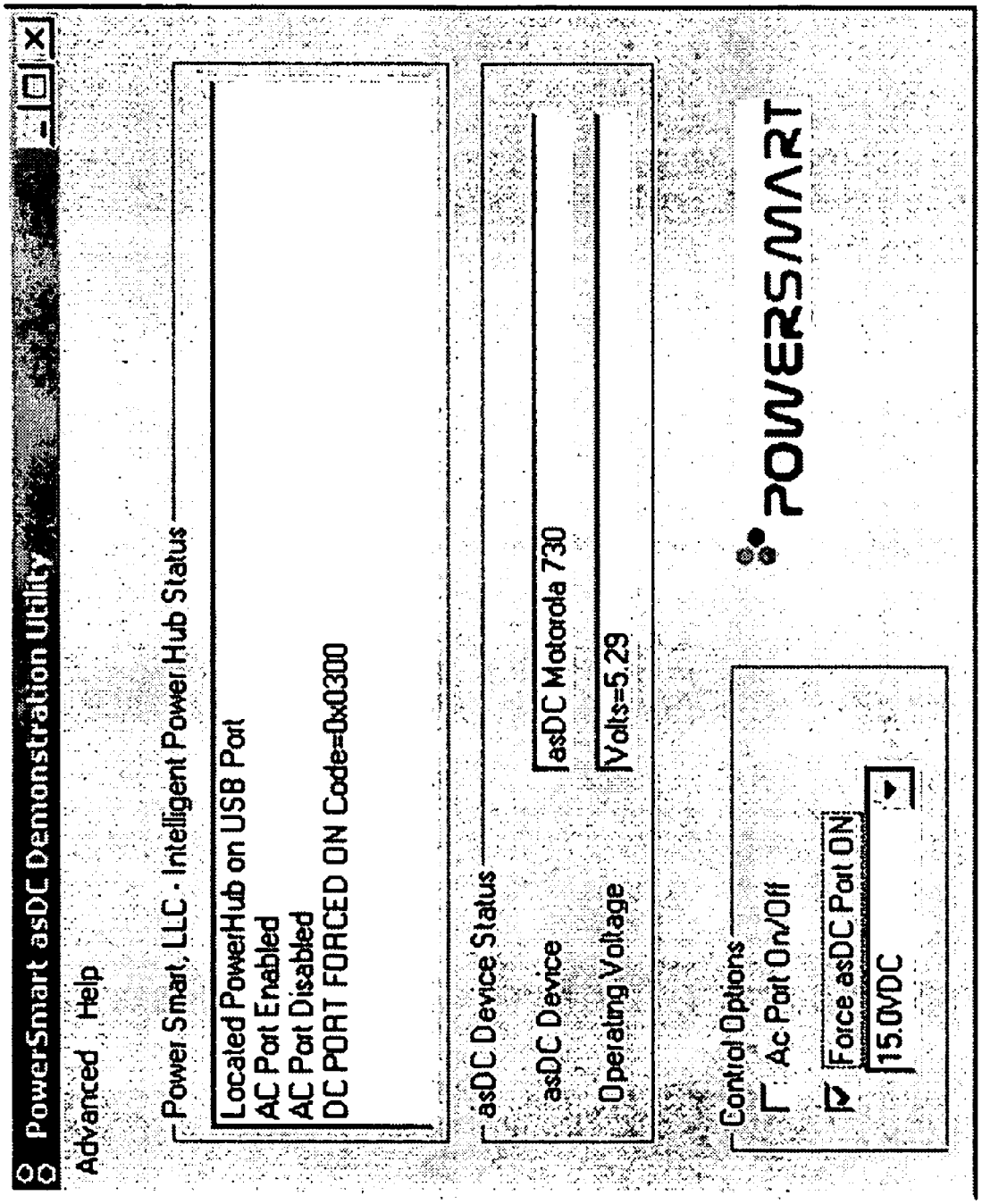

As depicted in FIGS. 33-34, the user turns the power on for the DC receptacle. In this example, the user selects a different voltage to be output to the DC receptacle. The user then selects the "force asDC port ON" check box. A check mark appears in the check box to indicate that the power is being transmitted to the DC receptacle. In addition, a line appears in the power hub status indicating that the DC port was forced on, as depicted in FIG. 34. In this example, the status line also indicates the code for the voltage and/or the device name.

Figure 35:
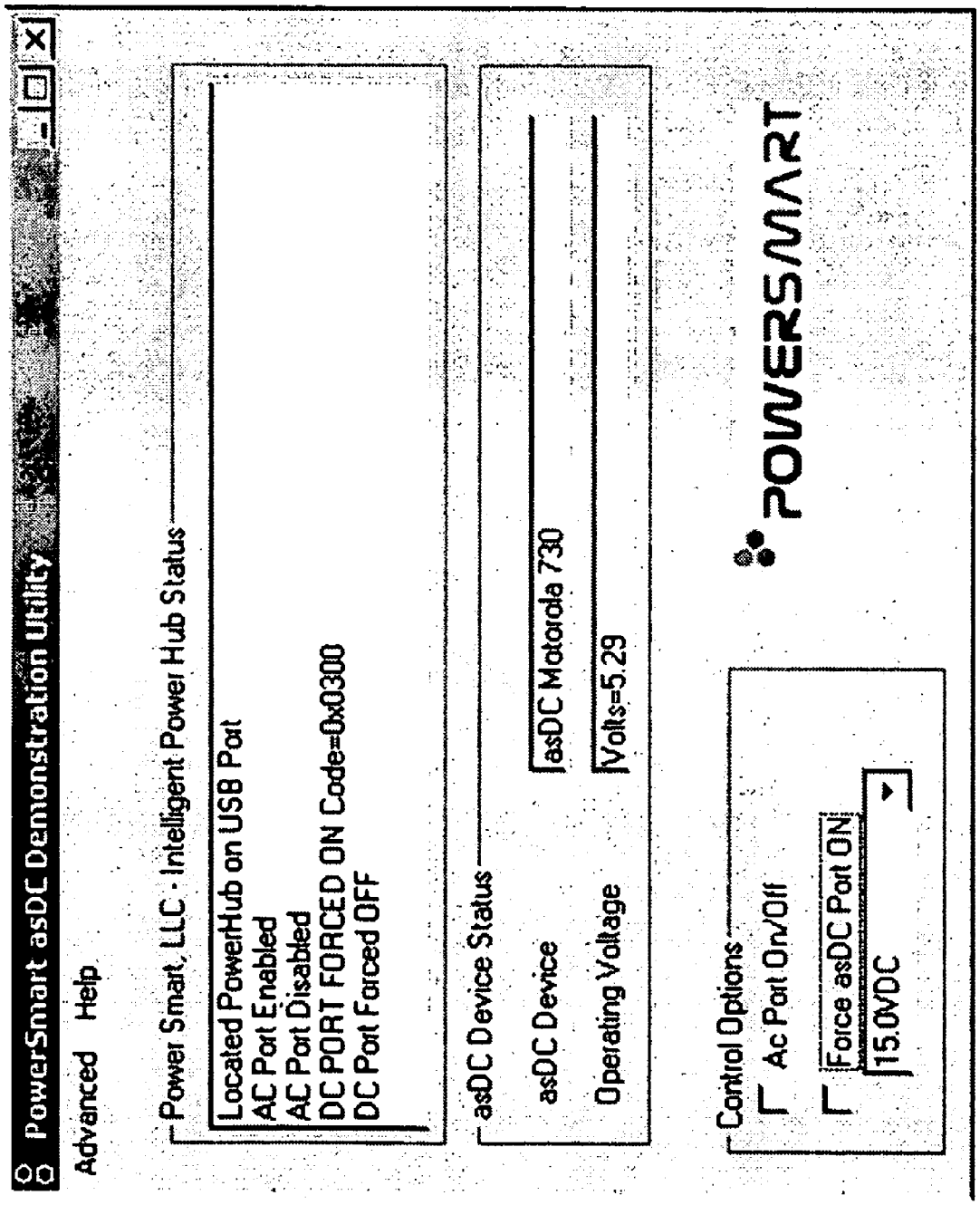

The user may select the check box for the DC port again to force the DC receptacle off, as indicated in FIG. 35. A status line is generated to the power hub status indicating that the DC port was forced off.

Figure 36:
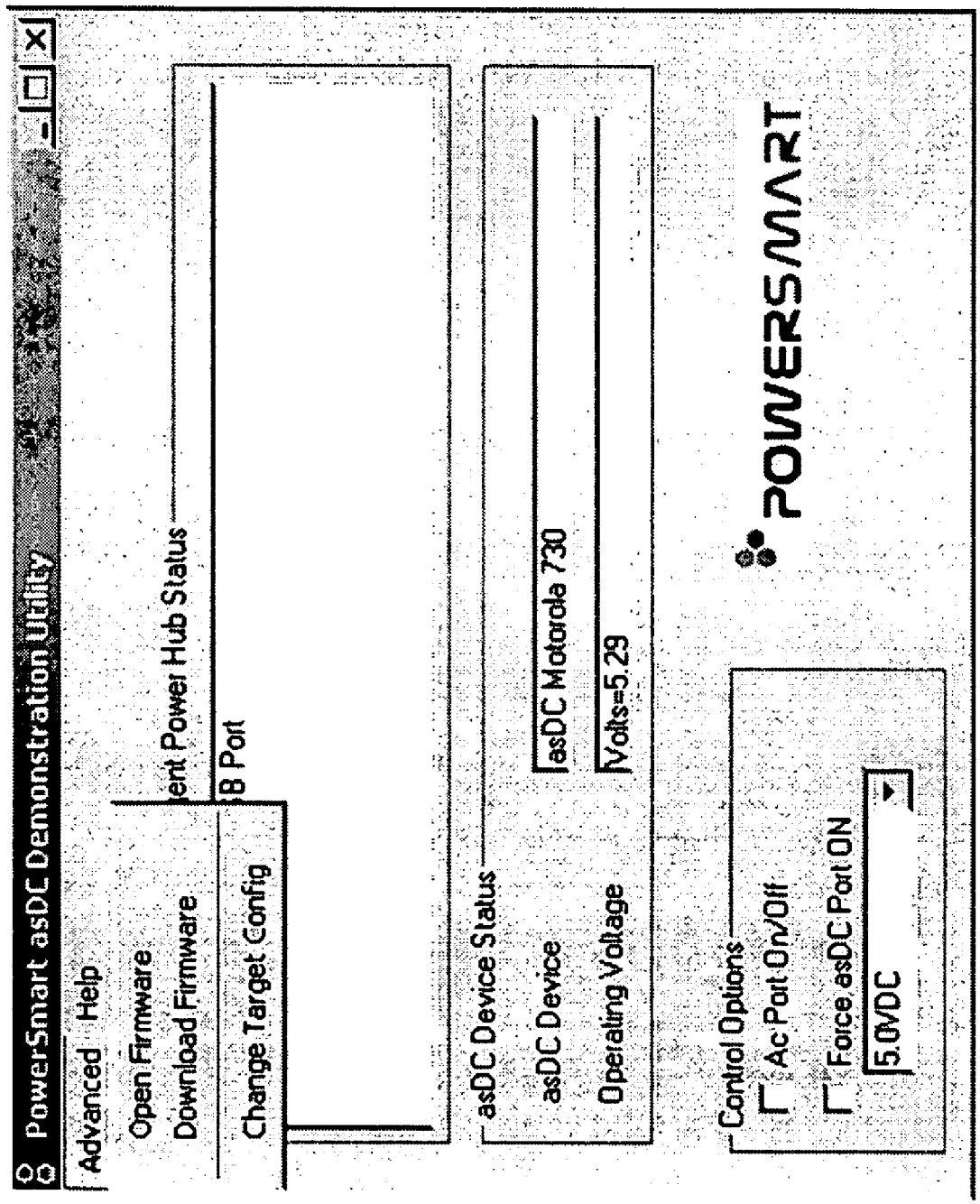
Figure 37:
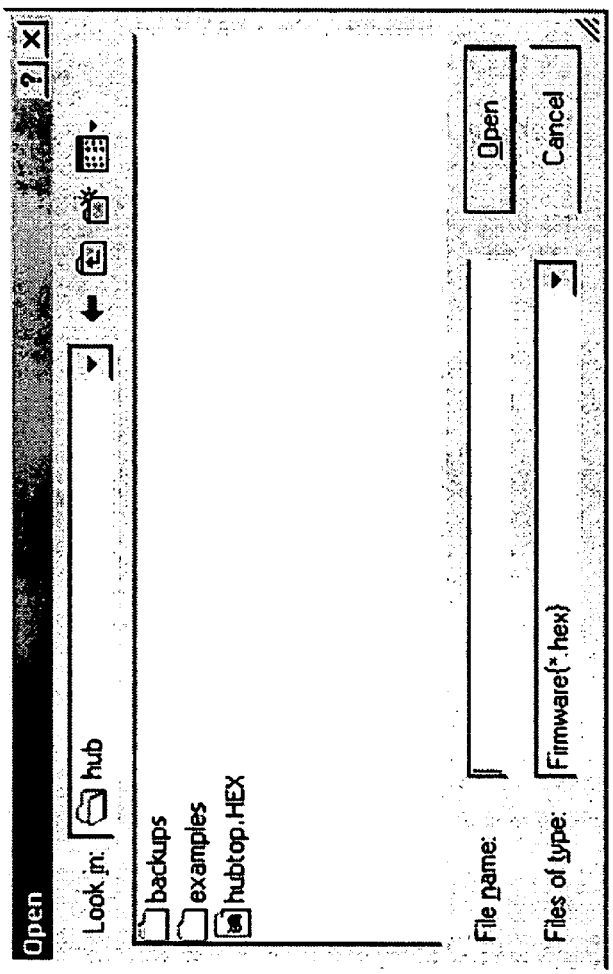
Figure 38:
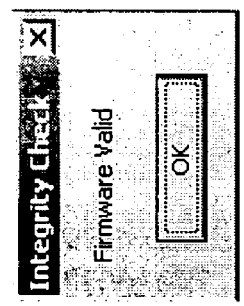

The UI enables the user to update the firmware on the power hub, as indicated by FIG. 36. The UI enables the user to select from an open firmware option and a download firmware option. The open firmware option may be used to locate a file that is to be installed, as indicated in FIG. 37. The user selects the file to be opened, and the contents of the file are checked for integrity. If the integrity check is successful, an integrity check window appears and identifies the firmware as being valid, as indicated in FIG. 38. When the user selects the "OK" button from the integrity check status window, the firmware is opened and downloaded.

Figure 39:
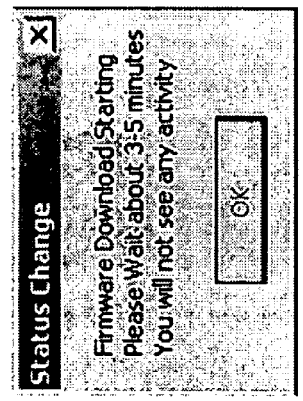
Figure 40:
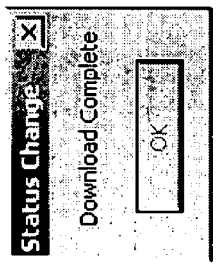

If the user selects the download firmware option from the display of FIG. 36, a status change window is generated indicating that the firmware download is starting, as depicted in FIG. 39. If the download process is successful, a status change window is generated indicating that the download is complete, as depicted in FIG. 40.

When the firmware has been downloaded, the user may select the reset on the power hub or cycle the power supply for the power hub by disconnecting the power supply from the power hub and reconnecting it. The user may relaunch the UI if desired.

Figure 41:
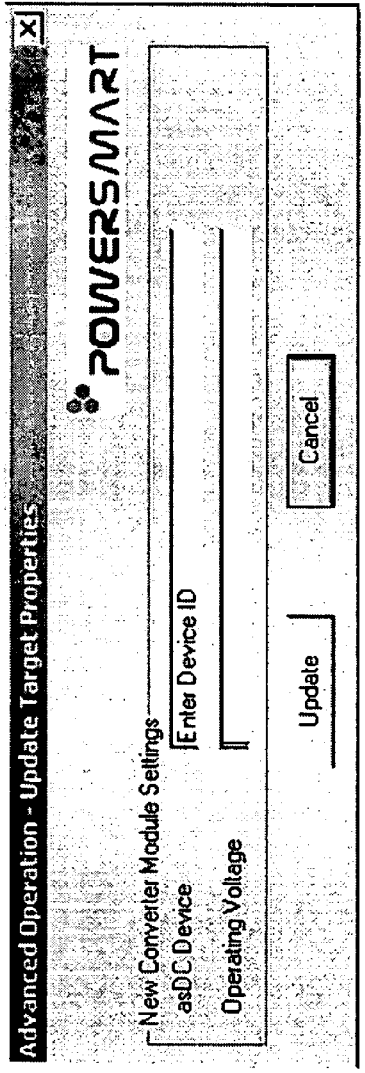
Figure 42:
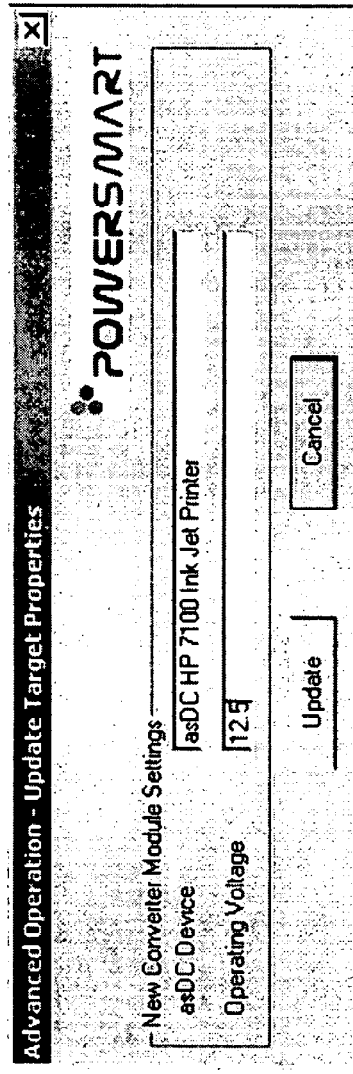
Figure 43:
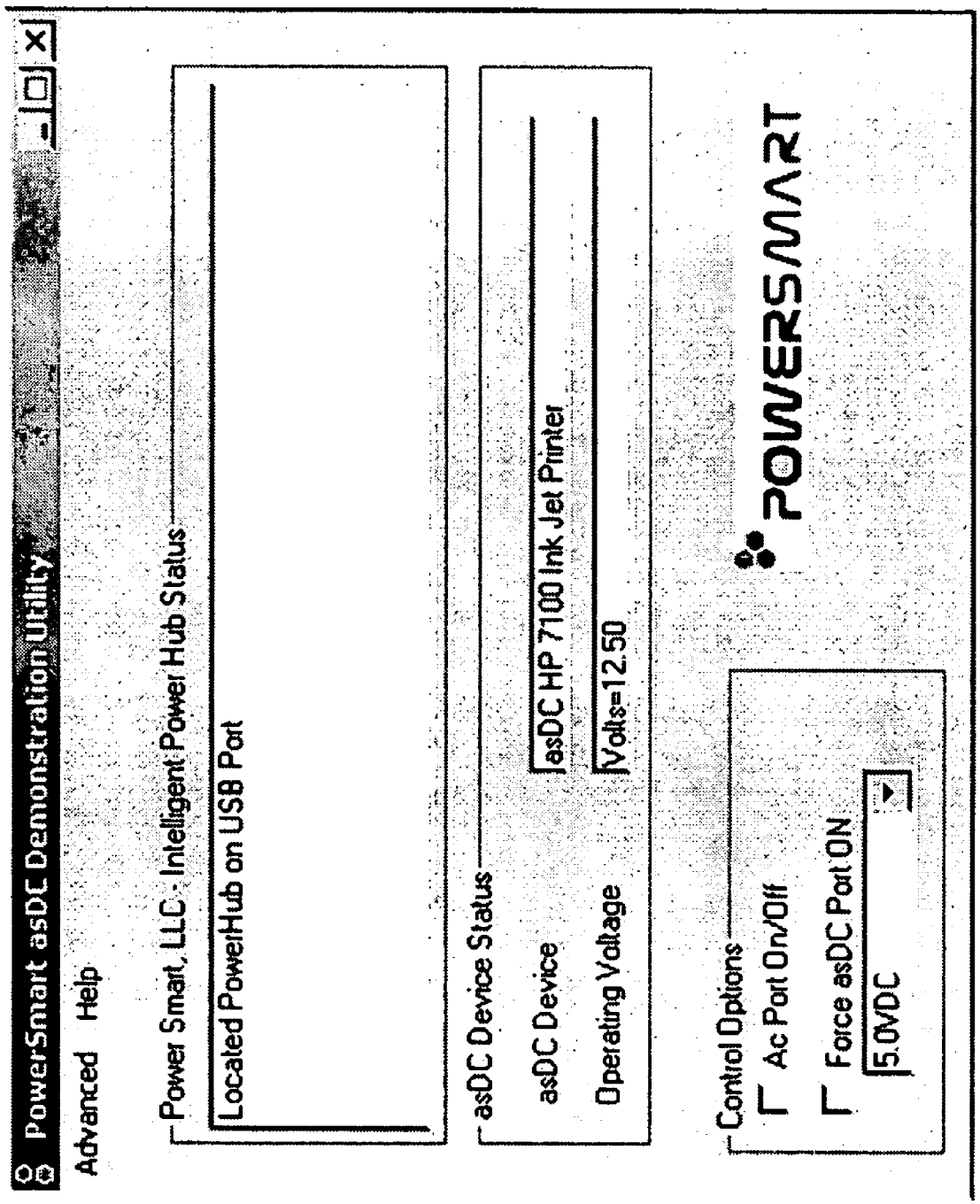

A third option from the advanced menu option from FIG. 36 enables a user to change a target configuration of an asDC enabled device. When the user selects the change target configuration option from the menu, an update target properties window is generated for display, as depicted in FIG. 41. The user enters new values for the asDC device name and its operating voltage, as depicted in FIG. 42. When the asDC device is connected to the power hub, the power hub recognizes the device and its required operating voltage, as depicted in FIG. 43.

Those skilled in the art will appreciate that variations from the specific embodiments disclosed above are contemplated by the invention. The invention should not be restricted to the above embodiments, but should be measured by the following claims.

What is claimed is:

1. A power system for configuring power comprising:
    at least one connector configured to convey alternating current (AC) power and selected from a group consisting of a line-cord and a plug;
    at least one of direct current (DC) receptacle;
    a communication system configured to receive at least one externally transmitted communication comprising configuration data that, when processed, identifies at least one selected DC power level;
    an AC to DC regulator configured to convert AC power to DC power;
    at least one DC to DC regulator configured to receive the DC power from the AC to DC regulator, to convert the DC power to a minimal DC power level, to generate the DC power at the minimal DC power level for the at least one DC receptacle for at least a selected time period, to convert the DC power to the selected DC power level, and to generate the DC power at the selected DC power level for the at least one DC receptacle, the selected DC power level not initially preset; and
    a processor configured to configure the at least one DC to DC regulator to convert the DC power to the minimal DC power level, to enable generating the DC power at the minimal DC power level to the at least one DC receptacle for at least the selected time period, to receive the communication from the communication system, to process the communication and, in response thereto, to determine the selected DC power level based on the configuration data, to configure the at least one DC to DC regulator to convert the DC power to the selected DC power level, and to enable generating the DC power at the selected DC power level to the at least one DC receptacle.

2. The system of claim 1 wherein the processor is configured to configure the at least one DC to DC regulator to generate DC power at the minimal DC power level for the at least one DC receptacle at least until the communication system receives the communication.

3. The system of claim 1 further comprising at least one AC receptacle configured to convey AC power at an AC power level.

4. The system of claim 1 wherein:
    the configuration data comprises an identification of the selected DC power level; and
    the processor is configured to process the communication with the selected DC power level identification and, in response thereto, to configure the at least one DC to DC regulator to convert the DC power to the selected DC power level and to enable generating the DC power at the selected DC power level to the at least one DC receptacle.

5. The system of claim 1 wherein:
    the configuration data comprises at least one particular device identification;
    the power system comprises memory comprising a plurality of device identifications and corresponding DC power levels; and
    the processor is configured to process the communication with the particular device identification and, in response thereto, to search the memory to determine the selected DC power level corresponding to the particular device identification.

6. The system of claim 1 wherein the power system comprises at least one member of another group consisting of a power strip, a rack mount system, a cabinet mount system, and a detachable device.

7. The system of claim 1 further comprising an electrical device configured to receive the DC power at the selected DC power level from the at least one DC receptacle.

8. The system of claim 7 wherein the electrical device comprises at least one member of another group consisting of a computer, a printer, a fax machine, a pocket PC, a personal digital assistant, a phone, a camera, a recording device, an audio device, a video device, and a drill.

9. The system of claim 1 wherein the selected DC power level comprises a selected voltage level.

10. The system of claim 1 further comprising an electrical supply configured to transfer the AC power received by the at least one connector, wherein the communication system is configured to transmit or receive at least one other communication through the electrical supply.

11. The system of claim 1 further comprising:
    a receiving connector; and
    a detachable device comprising:
        another connector configured to receive AC power and to removably connect to at least one member of a second group consisting of the receiving connector and a power source;
        at least one other DC receptacle;
        another AC to DC regulator configured to convert AC power to other DC power;
        at least one other DC to DC regulator configured to receive the other DC power from the other AC to DC regulator, to convert the other DC power to a second selected DC power level, and to generate the other DC power at the second selected DC power level for the at least one other DC receptacle, the second selected DC power level not initially preset; and
        another processor configured to determine the second selected DC power level, to configure the at least one other DC to DC regulator to convert the other DC power to the second selected DC power level, and to enable generating the other DC power at the second selected DC power level to the at least one other DC receptacle.

12. The system of claim 1 wherein:
    the power system comprises a plurality of DC receptacles and a plurality of DC to DC regulators, each corresponding to one of the DC receptacles;
    each DC to DC regulator is configured to receive the DC power from the AC to DC regulator, to convert the DC power to a particular selected DC power level, and to generate the particular selected DC power level for the corresponding receptacle, the particular selected DC power level not initially preset; and the processor is configured to determine the particular selected DC power level for each DC to DC regulator, to configure each DC to DC regulator to convert the DC power to the particular DC power level, and to enable generating the DC power at each particular DC power level to each corresponding DC receptacle.

13. The system of claim 1 wherein the communication system is configured to communicate via at least one format selected from another group consisting of a universal serial bus format, a Bluetooth format, an Ethernet format, a Firewire format, a cable format, a phone line format, a digital subscriber line service format, and an internet protocol format.

14. The system of claim 1 wherein the communication system is configured to receive the communication through at least one member of another group consisting of a communication interface of the power system and the at least one DC receptacle.

15. The system of claim 1 wherein the at least one DC receptacle is configured to receive the communication and the communication system comprises at least one modulator configured to receive the communication from the at least one DC receptacle and to transmit the communication to the processor.

16. A power system for configuring power, the system comprising:
at least one connector configured to convey alternating current (AC) power and selected from a group consisting of a line-cord and a plug;
at least one direct current (DC) receptacle;
a communication system configured to receive at least one externally transmitted communication comprising configuration data that, when processed, identifies at least one selected DC power level;
a power converter configured to convert the AC power to DC power at a minimal DC power level, to generate the DC power at the minimal DC power level for the at least one DC receptacle for at least a selected time period, to convert the AC power to DC power for the selected DC power level, and to generate the DC power at the selected DC power level for the at least one DC receptacle, the selected DC power level not initially preset;
a processor configured to configure the power converter to convert the AC power to the DC power at the minimal DC power level, to enable generating the DC power at the minimal DC power level to the at least one DC receptacle for at least the selected time period, to receive the communication from the communication system, to process the communication and, in response thereto, to determine the selected DC power level based on the configuration data, to configure the power converter to convert the AC power to the DC power at the selected DC power level, and to enable generating the DC power at the selected DC power level to the at least one DC receptacle.

17. The system of claim 16 wherein the processor is configured to configure the power converter to generate DC power at the minimal DC power level for the at least one DC receptacle at least until the communication system receives the communication.

18. The system of claim 16 further comprising at least one AC receptacle configured to convey AC power at an AC power level.

19. The system of claim 16 wherein:
the configuration data comprises an identification of the selected DC power level; and
the processor is configured to process the communication with the selected DC power level identification and, in response thereto, to dynamically configure the power converter to dynamically convert the AC power to the DC power at the selected DC power level and to enable generating the DC power at the selected DC power level to the at least one DC receptacle.

20. The system of claim 16 wherein:
the configuration data comprises at least one particular device identification;
the power system comprises memory comprising a plurality of device identifications and corresponding DC power levels; and
the processor is configured to process the communication with the particular device identification and, in response thereto, to search the memory to determine the selected DC power level corresponding to the particular device identification.

21. The system of claim 16 wherein the power system comprises at least one member of another group consisting of a power strip, a rack mount system, a cabinet mount system, and a detachable device.

22. The system of claim 16 further comprising an electrical device configured to receive the DC power at the selected DC power level from the at least one DC receptacle.

23. The system of claim 22 wherein the electrical device comprises at least one member of another group consisting of a computer, a printer, a fax machine, a pocket PC, a personal digital assistant, a phone, a camera, a recording device, an audio device, a video device, and a drill.

24. The system of claim 16 wherein the selected DC power level comprises a selected voltage level.

25. The system of claim 16 further comprising an electrical supply configured to transfer the AC power received by the at least one connector, wherein the communication system is configured to transmit or receive at least one other communication through the electrical supply.

26. The system of claim 16 further comprising:
a receiving connector; and
a detachable device comprising:
another connector configured to receive AC power and to removably connect to at least one member of a second group consisting of the receiving connector and a power source;
at least one other DC receptacle;
another power converter configured to convert the AC power to other DC power at a second selected DC power level and to generate the other DC power at the second selected DC power level for the at least one other DC receptacle, the second selected DC power level not initially preset; and
another processor configured to determine the second selected DC power level, to configure the other power converter to convert the AC power to the other DC power at the second selected DC power level, and to enable generating the other DC power at the second selected DC power level to the at least one other DC receptacle.

27. The system of claim 16 wherein:
the power converter comprises:
an AC to DC regulator configured to convert the AC power to DC power; and
at least one DC to DC regulator configured to receive the DC power from the AC to DC regulator, to convert the DC power to the selected DC power level, and to generate the DC power at the selected DC power level for the at least one DC receptacle; and
the processor is configured to configure the at least one DC to DC regulator to convert the DC power to the selected DC power level and to enable generating the DC power at the selected DC power level to the at least one DC receptacle.

28. The system of claim 16 wherein:

the power system comprises at least one other DC receptacle;

the communication system is further configured to receive another externally transmitted communication comprising other configuration data that, when processed, identifies at least one second selected DC power level;

the power converter is further configured to convert the AC power to DC power for the second selected DC power level and to generate the DC power at the second selected DC power level for the at least one other DC receptacle, the second selected DC power level not initially preset; and the processor is further configured to process the other communication and, in response thereto, to determine the second selected DC power level, to configure the power converter to convert the AC power to the DC power at the second selected DC power level, and to enable generating the DC power at the second selected DC power level to the at least one other DC receptacle.

29. The system of claim 16 wherein the communication system is configured to communicate via at least one format selected from another group consisting of a universal serial bus format, a Bluetooth format, an Ethernet format, a Firewire format, a cable format, a phone line format, a digital subscriber line service format, and an internet protocol format.

30. The system of claim 16 wherein the communication system is configured to receive the communication through at least one member of another group consisting of a communication interface of the power system and the at least one DC receptacle.

31. The system of claim 16 wherein the at least one DC receptacle is configured to receive the communication and the communication system comprises at least one modulator configured to receive the communication from the at least one DC receptacle and to transmit the communication to the processor.

32. A power system for configuring power, the system comprising:

at least one connector configured to convey alternating current (AC) power and selected from a group consisting of a line-cord and a plug;

at least one direct current (DC) receptacle;

a communication system configured to receive at least one externally transmitted communication comprising configuration data that, when processed, identifies at least one selected DC power level;

a power converter configured to convert the AC power to DC power at a minimal DC power level, to generate the DC power at the minimal DC power level for the at least one DC receptacle for at least a minimal time period, to convert the AC power to DC power for the selected DC power level, and to generate the DC power at the selected DC power level for the at least one DC receptacle, the selected DC power level not initially preset;

a processor configured to configure the power converter to convert the AC power to the DC power at the minimal DC power level, to enable generating the DC power at the minimal DC power level to the at least one DC receptacle at least until the communication is received, to receive the communication from the communication system, to process the communication and, in response thereto, to determine the selected DC power level based on the configuration data, to configure the power converter to convert the AC power to the DC power at the selected DC power level, and to enable generating the DC power at the selected DC power level to the at least one DC receptacle.

33. The system of claim 32 wherein:

the configuration data comprises an identification of the selected DC power level; and the processor is configured to process the communication with the selected DC power level identification and, in response thereto, to configure the power converter to convert the AC power to the DC power at the selected DC power level and to enable generating the DC power at the selected DC power level to the at least one DC receptacle.

34. The system of claim 32 wherein:

the configuration data comprises at least one particular device identification;

the power system comprises memory comprising a plurality of device identifications and corresponding DC power levels; and the processor is configured to process the communication with the particular device identification and, in response thereto, to search the memory to determine the selected DC power level corresponding to the particular device identification.

35. The system of claim 32 further comprising an electrical device configured to receive the DC power at the selected DC power level from the at least one DC receptacle.

36. The system of claim 32 wherein:

the power system comprises a plurality of DC receptacles;

the power converter is configured to convert the AC power to DC power for a plurality of selected DC power levels that are not initially preset; and the processor is configured to determine a particular selected DC power level for each corresponding DC receptacle, to configure the power converter to convert the AC power to the DC power at the particular DC power levels, and to enable generating the DC power at the particular DC power levels to the corresponding DC receptacles.

37. A power system for configuring power, the system comprising:

at least one connector configured to convey alternating current (AC) power;

at least one direct current (DC) receptacle;

a communication system configured to receive an externally transmitted communication comprising configuration data that, when processed, identifies at least one selected DC power level;

a power converter configured to convert the AC power to DC power at a minimal DC power level, to generate the DC power at the minimal DC power level for the at least one DC receptacle for at least a minimal time period, to convert the AC power to DC power for at least one selected DC power level, and to generate the DC power at the selected DC power level for the at least one DC receptacle, the selected DC power level not initially preset;

a processor configured to configure the power converter to convert the AC power to the DC power at the minimal DC power level, to enable generating the DC power at the minimal DC power level to the at least one DC receptacle for at least the minimal time period, to receive the communication from the communication system, to determine the selected DC power level based on the configuration data, to configure the power converter to convert the AC power to the DC power at the selected DC power level, and to enable generating the DC power at the selected DC power level to the at least one DC receptacle.

38. A power system for configuring power comprising:
at least one connector configured to convey alternating current (AC) power and selected from a group consisting of a line-cord and a plug;
a plurality of direct current (DC) receptacles;
a communication system configured to receive a plurality of externally transmitted communications, each communication comprising configuration data that, when processed, identifies at least one selected DC power level;
an AC to DC regulator configured to convert AC power to DC power;
a plurality of DC to DC regulators, each corresponding to one of the DC receptacles and each configured to receive the DC power from the AC to DC regulator, to convert the DC power to a minimal DC power level for the corresponding DC receptacle, to generate the DC power at the minimal DC power level for the corresponding DC receptacle for a corresponding selected time period, to convert the DC power to a selected DC power level for the corresponding DC receptacle, and to generate the DC power at the selected DC power level for the corresponding DC receptacle, each selected DC power level for each corresponding DC receptacle independent of other selected DC power levels for other corresponding DC receptacles, each selected DC power level not initially preset; and
a processor configured to configure each DC to DC regulator to convert the DC power to the minimal DC power level, to enable generating the DC power at the minimal DC power level for the corresponding DC receptacle for at least the corresponding selected time period, to process the communications and, in response thereto, to determine each selected DC power level, to configure each DC to DC regulator to convert the DC power to the selected DC power level for the corresponding DC receptacle, and to enable generating the DC power at the selected DC power levels for the corresponding DC receptacles.

39. A power system for configuring power comprising:
at least one connector configured to convey alternating current (AC) power;
a plurality of direct current (DC) receptacles each configured to receive at least one externally transmitted communication comprising configuration data that, when processed, identifies at least one selected DC power level;
an AC to DC regulator configured to convert the AC power to DC power;
a plurality of DC to DC regulators, each corresponding to one of the DC receptacles and each configured to receive the DC power from the AC to DC regulator, to convert the DC power to a minimal DC power level for the corresponding DC receptacle for at least a corresponding selected time period, to generate the DC power at the minimal DC power level for the corresponding DC receptacle, to convert the DC power to a selected DC power level for the corresponding DC receptacle, and to generate the DC power at the selected DC power level for the corresponding DC receptacle, each selected DC power level for each corresponding DC receptacle independent of other selected DC power levels for other corresponding DC receptacles, each selected DC power level not initially preset;
a processor configured to configure each DC to DC regulator to convert the DC power to the minimal DC power level, to enable generating the DC power at the minimal DC power level for the corresponding DC receptacle for at least the corresponding selected time period, to process the communications and, in response thereto, to determine each selected DC power level, to configure each DC to DC regulator to convert the DC power to the selected DC power level for the corresponding DC receptacle, and to enable generating the DC power at the selected DC power levels for the corresponding DC receptacles; and
a communication system configured to receive the communications from the DC receptacles and to transmit the communications to the processor.

40. A power system for configuring power comprising:
at least one connector configured to convey alternating current (AC) power and selected from a group consisting of a line-cord and a plug;
at least one DC receptacle configured to receive at least one externally transmitted communication comprising configuration data that, when processed, identifies at least one selected DC power level;
an AC to DC regulator configured to convert the AC power to DC power;
at least one DC to DC regulator configured to receive the DC power from the AC to DC regulator, to convert the DC power to a minimal DC power level for the at least one DC receptacle for at least a selected time period, to generate the DC power at the minimal DC power level for the at least one DC receptacle, to convert the DC power to a selected DC power level for the at least one DC receptacle, and to generate the DC power at the selected DC power level for the at least one DC receptacle, the selected DC power level not initially preset;
a processor configured to configure the at least one DC to DC regulator to convert the DC power to the minimal DC power level, to enable generating the DC power at the minimal DC power level for the at least one DC receptacle for at least the selected time period, to process the communication and, in response thereto, to determine the selected DC power level based on the configuration data, to configure the at least one DC to DC regulator to convert the DC power to the selected DC power level for the at least one DC receptacle, and to enable generating the DC power at the selected DC power level for the at least one DC receptacle; and
a communication system configured to receive the communication from the at least one DC receptacle and to transmit the communication to the processor.

* * * * *